United States Patent
Asai

(10) Patent No.: US 9,893,910 B2
(45) Date of Patent: Feb. 13, 2018

(54) NON-TRANSITORY COMPUTER-READABLE MEDIUM STORING INSTRUCTIONS

(71) Applicant: BROTHER KOGYO KABUSHIKI KAISHA, Nagoya-shi, Aichi-ken (JP)

(72) Inventor: Norihiko Asai, Tajimi (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 15/413,054

(22) Filed: Jan. 23, 2017

(65) Prior Publication Data
US 2017/0244579 A1 Aug. 24, 2017

(30) Foreign Application Priority Data

Feb. 22, 2016 (JP) .................................. 2016-030762
Mar. 16, 2016 (JP) .................................. 2016-052284
(Continued)

(51) Int. Cl.
*H04B 5/00* (2006.01)
*H04L 13/08* (2006.01)
(Continued)

(52) U.S. Cl.
CPC ........... *H04L 13/08* (2013.01); *H04M 11/007* (2013.01); *H04W 4/008* (2013.01); *H04W 4/023* (2013.01);
(Continued)

(58) Field of Classification Search
CPC .................................................. G06F 3/1285
See application file for complete search history.

(56) References Cited

U.S. PATENT DOCUMENTS

| 2005/0144161 | A1* | 6/2005 | Hirota | G06F 9/4443 |
| 2006/0101280 | A1* | 5/2006 | Sakai | G06F 21/35 713/184 |

(Continued)

FOREIGN PATENT DOCUMENTS

| JP | 2007-166538 A | 6/2007 |
| JP | 2015-012518 A | 1/2015 |

*Primary Examiner* — Cindy Trandai
(74) *Attorney, Agent, or Firm* — Merchant & Gould P.C.

(57) ABSTRACT

A non-transitory computer-readable medium storing instructions readable by a mobile terminal including a memory, an input interface, a first communication interface and a second communication interface, the instructions causing the mobile terminal to perform processes comprising: a storage processing of storing workflow information including device identification information and action identification information; a specifying processing of specifying the image processing apparatus, as a designated device; an information reception processing of receiving connection information from the designated device through the first communication interface; an extraction processing of extracting the workflow information coinciding with a first condition, among the workflow information; and an execution instruction processing of transmitting execution instruction information to the designated device through the second communication interface by using the connection information, wherein the execution instruction information is to instruct execution of the action identified by the action identification information.

13 Claims, 14 Drawing Sheets

(30) Foreign Application Priority Data

Mar. 16, 2016 (JP) ................................ 2016-052286
Apr. 28, 2016 (JP) ................................ 2016-090068

(51) Int. Cl.

| | |
|---|---|
| *H04W 4/00* | (2009.01) |
| *H04W 40/22* | (2009.01) |
| *H04W 4/02* | (2009.01) |
| *H04W 60/02* | (2009.01) |
| *H04M 11/00* | (2006.01) |
| *H04W 88/02* | (2009.01) |

(52) U.S. Cl.

CPC ........... *H04W 40/22* (2013.01); *H04W 60/02* (2013.01); *H04W 88/02* (2013.01)

(56) References Cited

U.S. PATENT DOCUMENTS

| | | | | |
|---|---|---|---|---|
| 2006/0143181 A1* | 6/2006 | Liu | ........................ | H04L 41/12 |
| 2007/0288622 A1* | 12/2007 | Bodin | ................. | H04L 12/2803 |
| | | | | 709/223 |
| 2009/0036056 A1* | 2/2009 | Oshima | ............... | H04M 1/7253 |
| | | | | 455/41.3 |
| 2009/0052348 A1* | 2/2009 | Kato | ................... | H04L 63/0492 |
| | | | | 370/254 |
| 2009/0066998 A1* | 3/2009 | Kato | ...................... | G01C 21/26 |
| | | | | 358/1.15 |
| 2010/0125651 A1* | 5/2010 | Zapata | ...................... | G06F 8/65 |
| | | | | 709/220 |
| 2013/0215467 A1* | 8/2013 | Fein | ....................... | G06F 3/1204 |
| | | | | 358/1.15 |
| 2013/0229687 A1* | 9/2013 | Yamauchi | ............. | G06F 3/1204 |
| | | | | 358/1.15 |
| 2014/0032790 A1* | 1/2014 | Sueyoshi | ................ | G06F 13/10 |
| | | | | 710/14 |
| 2014/0081746 A1* | 3/2014 | Gomi | ................... | G06Q 20/409 |
| | | | | 705/14.49 |
| 2014/0355057 A1* | 12/2014 | Jang | ................... | G06K 7/10297 |
| | | | | 358/1.15 |
| 2015/0002890 A1 | 1/2015 | Okuno | | |
| 2015/0096015 A1* | 4/2015 | Ren | ......................... | G06F 21/35 |
| | | | | 726/20 |
| 2017/0031675 A1* | 2/2017 | Oshima | ..................... | G06F 8/65 |
| 2017/0111247 A1* | 4/2017 | Uchiyama | ........... | H04L 43/0805 |

\* cited by examiner

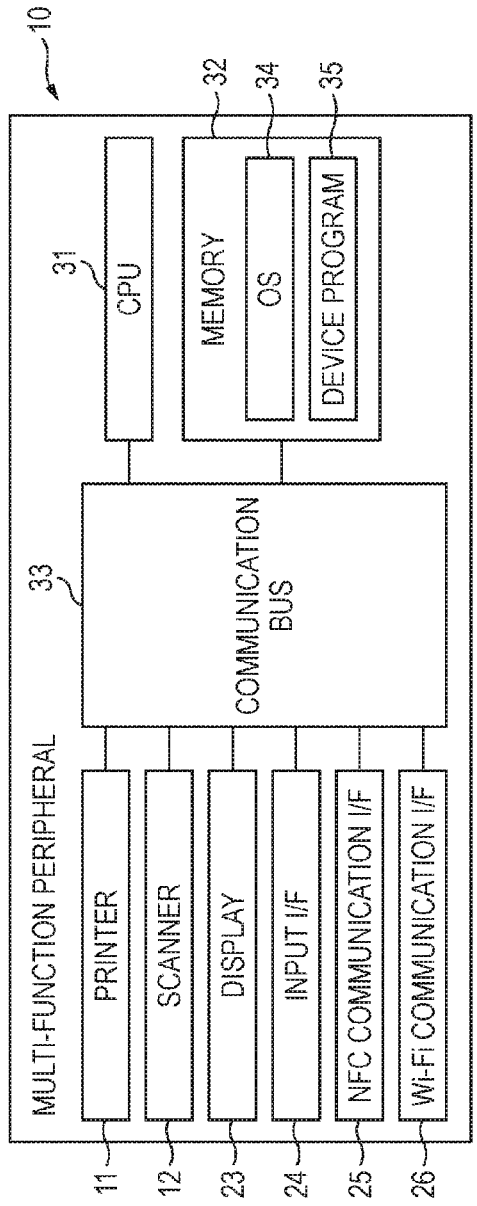
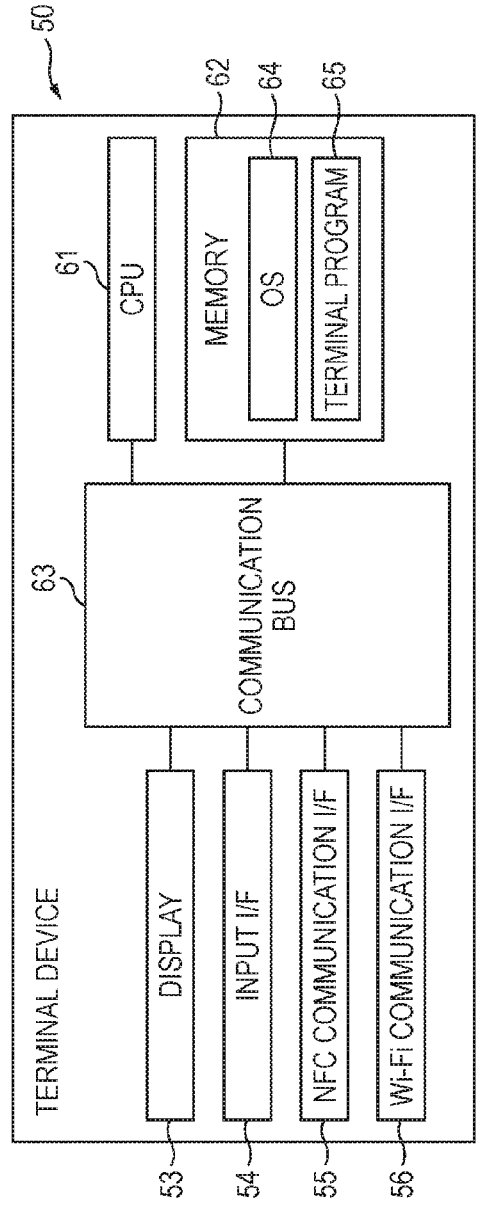
FIG. 2A
FIG. 2B

FIG. 3A

| ACTION ID | CAPABILITY INFORMATION |
|---|---|
| PRINTER | SIZE INFORMATION "A4", "A3", "L TYPE" |
| | COLOR INFORMATION "MONOCHROME", "COLOR" |
| SCANNER | RESOLUTION INFORMATION "300 dpi", "600 dpi" |
| | FORMAT INFORMATION "TIFF", "PDF" |

FIG. 3B

| WF-ID | DEVICE ID | ACTION ID | CONDITION INFORMATION |
|---|---|---|---|
| 001 | MFP-A | PRINTER | SIZE INFORMATION "A3", COLOR INFORMATION "MONOCHROME" |
| 002 | MFP-A | SCANNER | RESOLUTION INFORMATION "600 dpi", FORMAT INFORMATION "TIFF" |
| 003 | * | PRINTER | SIZE INFORMATION "L TYPE", COLOR INFORMATION "COLOR" |
| 004 | MFP-B | PRINTER | SIZE INFORMATION "A4", COLOR INFORMATION "MONOCHROME" |
| ... | ... | ... | ... |

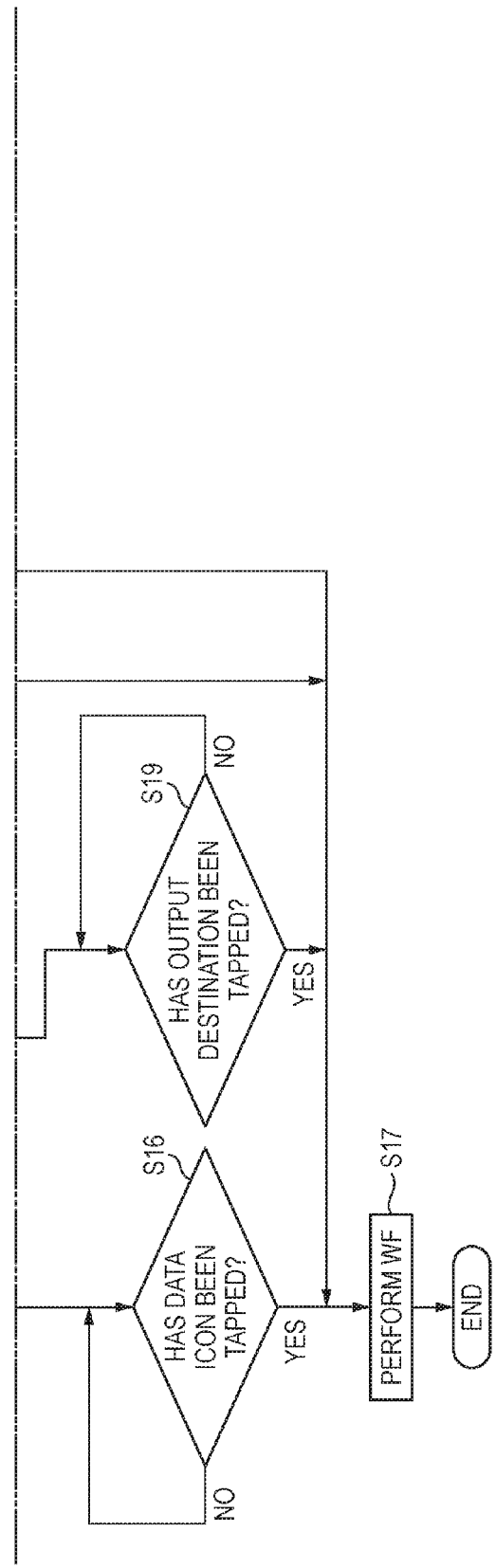

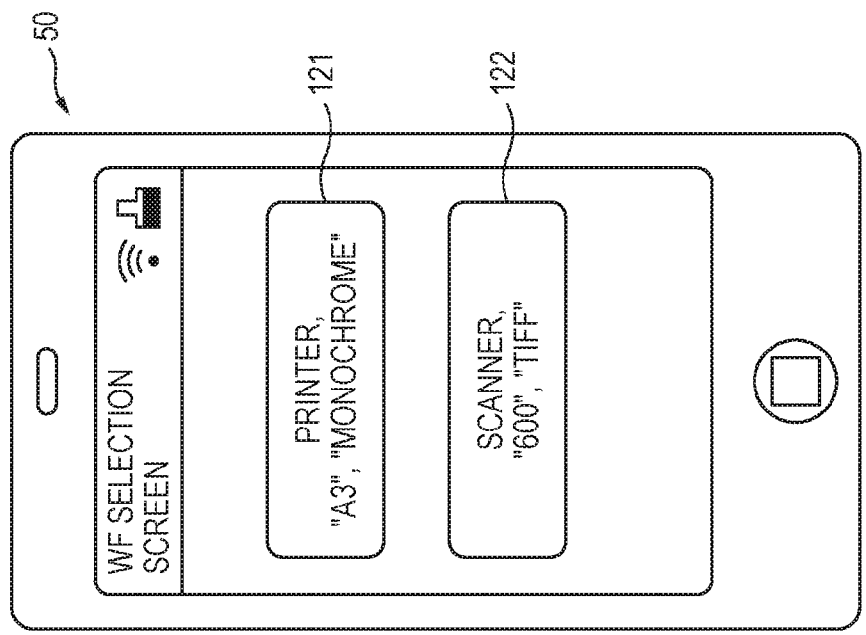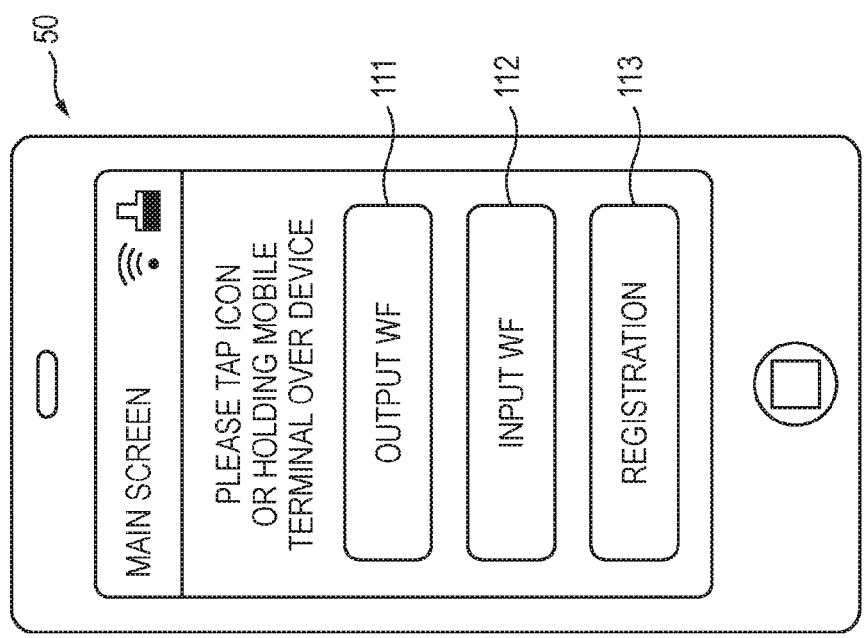

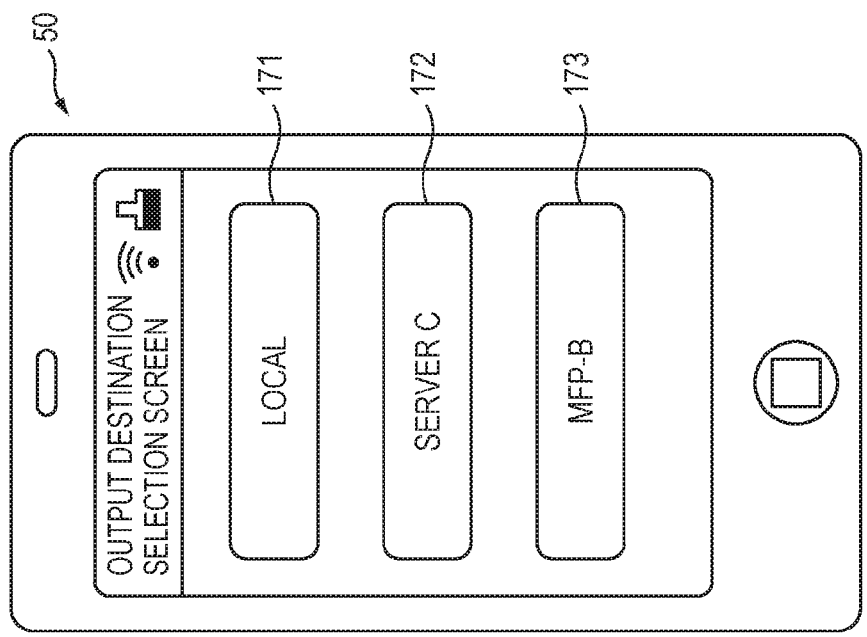

NON-TRANSITORY COMPUTER-READABLE MEDIUM STORING INSTRUCTIONS

CROSS-REFERENCE TO RELATED APPLICATION

This application claims priority from Japanese Patent Applications No. 2016-030762 filed on Feb. 22, 2016, No. 2016-052284 filed on Mar. 16, 2016, No. 2016-052286 filed on Mar. 16, 2016, and No. 2016-090068 filed on Apr. 28, 2016, the entire subject matter of which is incorporated herein by reference.

TECHNICAL FIELD

This disclosure relates to a non-transitory computer-readable medium storing instructions readable by a mobile terminal that operates an image processing apparatus using proximity wireless communication.

BACKGROUND

There is a technology of a mobile terminal to control an image processing apparatus by using proximity wireless communication such as NFC. For example, a mobile terminal receives information representing a communication system of a printer by using NFC and transmits print data to the printer using the communication system represented by the received information.

SUMMARY

However, the background technology may be not sufficiently respond to a user's desire for allowing a communication partner of the proximity wireless communication to perform various actions through a mobile terminal.

This disclosure is to provide a computer instructions for a mobile terminal capable of causing an image processing apparatus being in proximity wireless connection with a mobile terminal to perform various actions by using a simple operation.

According to one aspect of this disclosure, a non-transitory computer-readable medium storing instructions readable by a mobile terminal including a memory, an input interface, a first communication interface that performs proximity wireless communication with an external device, and a second communication interface that performs wireless communication, of which a communication distance is longer than the proximity wireless communication, with an external device, the instructions causing the mobile terminal to perform processes comprising: a storage processing of storing workflow information including device identification information and action identification information in the memory, wherein the device identification information is information to identify an image processing apparatus designated by a user, and the action identification information is information to identify an action designated by the user among a plurality of actions for image data; a specifying processing of specifying the image processing apparatus that is being in proximity wireless connection with the first communication interface, as a designated device; an information reception processing of receiving connection information from the designated device through the first communication interface, wherein the connection information is information required to communicate with the designated device through the second communication interface; an extraction processing of extracting the workflow information coinciding with a first condition, among the workflow information stored in the memory, wherein the first condition is a condition where the workflow information includes designated device identification information that is the device identification information of the designated device; and an execution instruction processing of transmitting execution instruction information to the designated device through the second communication interface by using the connection information received in the information reception processing, wherein the execution instruction information is information used to instruct execution of the action identified by the action identification information included in the workflow information extracted by the extraction processing.

According to another aspect of this disclosure, a non-transitory computer-readable medium storing instructions readable by a mobile terminal including a memory, an input interface, a first communication interface that performs proximity wireless communication with an external device, and a second communication interface that performs wireless communication, of which a communication distance is longer than the proximity wireless communication, with an external device, the instructions causing the mobile terminal to perform processes comprising: a storage processing of storing workflow information including action identification information in the memory, wherein the action identification information is information to identify an action designated by the user among a plurality of actions for image data; a specifying processing of specifying the image processing apparatus that is being in proximity wireless connection with the first communication interface, as a designated device; an information reception processing of receiving device information from the designated device, wherein the device information includes: connection information required to communicate with the designated device through the second communication interface; and the action identification information of the action that is capable of being performed by the designated device; an extraction processing of extracting the workflow information including the action identification information received in the information reception processing, among the workflow information stored in the memory; and an execution instruction processing of transmitting execution instruction information to the designated device through the second communication interface by using the connection information received in the reception processing, wherein the execution instruction information is information used to instruct execution of the action identified by the action identification information included in the workflow information extracted by the extraction processing.

According to another aspect of this disclosure, a non-transitory computer-readable medium storing instructions readable by a mobile terminal including a memory, an input interface, a first communication interface that performs proximity wireless communication with an external device, and a second communication interface that performs wireless communication, of which a communication distance is longer than the proximity wireless communication, with an external device, the instructions causing the mobile terminal to perform processes comprising: a first decision processing of deciding a designated device as an input device or an output device, wherein the designated device is a device designated through the input interface, among a plurality of external devices that are communicable through the second communication interface; a second decision processing of deciding a connection device as the input device or the output device, wherein the connection device is a device being in proximity wireless connection with the first communication interface among the plurality of external devices that are communicable through the second communication interface; a registration processing of storing linkage action information including input device information and output device information in the memory, wherein the input information is information to identify the input device decided in the first decision processing or the second decision processing, and the output device information is information to identify the output device decided in the first decision processing or the second decision processing; a first operation reception processing of receiving a designation operation designating one of the linkage action information stored in the memory through the input interface; an input instruction processing of transmitting input instruction information to the input device identified by the input device information included in the designated linkage action information through the second communication interface, wherein the input instruction information is information to execute an input action, wherein the input action is an action in which the input device inputs target data to the input device, and wherein the target data is data to be transmitted from the input device to the mobile terminal; a data reception processing of receiving the target data from the input device through the second communication interface, as a response to the input instruction information; and an output instruction processing of transmitting output instruction information to the output device through the second communication interface, wherein the output device is a device identified by the output device information included in the designated linkage action information, wherein the output instruction information is information to execute an output action, and wherein the output action is an action in which the output device outputs the target data received in the data reception processing.

According to another aspect of this disclosure, a non-transitory computer-readable medium storing instructions readable by a mobile terminal including a memory, an input interface, a first communication interface that performs proximity wireless communication with an external device, and a second communication interface that performs wireless communication, of which a communication distance is longer than the proximity wireless communication, with an external device, the instructions causing the mobile terminal to perform processes comprising: a first operation reception processing of receiving a designation operation designating one of linkage action information stored in the memory through the input interface, wherein the linkage action information includes at least one of input device information to identify an input device and output device information to identify an output device; an instruction reception processing of receiving an execution instruction of a linkage action according to the designated linkage action information in response to receiving of the designation operation in the first operation reception process through at least one of the input interface and the first communication interface; a decision processing of deciding, in response to receiving of the execution instruction through the first communication interface in the instruction reception processing, a connection device as the input device or the output device, wherein the connection device is one of the plurality of external devices communicable through the second communication interface and is being in proximity wireless connection with the first communication interface, and wherein the execution instruction through the first communication interface is a instruction which is obtained by connecting to the connection device with the first communication interface by proximity wireless communication; an input instruction processing of transmitting input instruction information to one of the input device identified by the input device information included in the designated linkage action information and the input device decided in the first decision processing through the second communication interface, wherein the input instruction information is information to execute an input action, wherein the input action is an action in which the input device inputs target data to the input device, and wherein the target data is data to be transmitted from the input device to the mobile terminal to the input device; a data reception processing of receiving the target data from the input device through the second communication interface, as a response to the input instruction information; and an output instruction processing of transmitting output instruction information to the output device through the second communication interface, wherein the output device is identified by the output device information included in the designated linkage action information or the output device determined in the first determination processing, wherein the output instruction information is information to execute an output action, and wherein the output action is an action in which the output device outputs the target data received in the data reception processing.

According to another aspect of this disclosure, a non-transitory computer-readable medium storing instructions readable by a mobile terminal including a memory, an input interface, a first communication interface that performs proximity wireless communication with an external device, and a second communication interface that performs wireless communication, of which a communication distance is longer than the proximity wireless communication, with an external device, the instructions causing the mobile terminal to perform processes comprising: a registration processing of storing linkage action information including input device information and output device information in the memory, wherein the input device information is information to identify the input device designated by a user, and wherein the output device information is information to identify the output device designated by the user; a first acquiring processing of acquiring a designated device information to identify the designated device that is an image processing device in response to that the first communication interface is being in proximity wireless connection with the image processing device; an extraction processing of extracting the linkage action information including at least one of the input device information as the same as the designated device information and the output device information as the same as the designated device information, among the linkage action information stored in the memory; an input instruction processing of transmitting input instruction information to the input device identified by the input device information included in the extracted linkage action information through the second communication interface, wherein the input instruction information is information to execute an input action, wherein the input action is an action in which the input device inputs target data to the input device, and wherein the target data is data to be transmitted from the input device to the mobile terminal; an data reception processing of receiving the target data from the input device through the second communication interface as a response to the input instruction information; and an output instruction processing of transmitting output instruction information to the output device through the second communication interface, wherein the output device is identified by the output device information included in the extracted linkage action information, wherein the output instruction information is information to execute an output action, and wherein the output action is an action in which the output device outputs the target data received in the first data reception processing.

BRIEF DESCRIPTION OF THE DRAWINGS

The foregoing and additional features and characteristics of this disclosure will become more apparent from the following detailed descriptions considered with the reference to the accompanying drawings, wherein:

FIG. 2A is a block diagram of a multi-function peripheral 10, and FIG. 2B is a block diagram of a mobile terminal 50;

FIGS. 3A and 3B illustrate examples of data stored in memories 32 and 62, FIG. 3A illustrates device information of a multi-function peripheral 10A, and FIG. 3B illustrates a WF list;

FIG. 4 composed FIGS. 4A and 4B is a flowchart of a main process;

FIG. 5 composed

FIG. 6 composed

FIGS. 8A and 8B illustrate examples of display of a display 53, FIG. 8A illustrates a main screen, and FIG. 8B illustrates a WF selection screen;

FIG. 9A illustrates a device selection screen, and FIG. 9B illustrates an action selection screen;

FIG. 10A illustrates a setting screen, and FIG. 10B illustrates a data selection screen; and FIGS. 11A and 11B are examples of display of the display 53, FIG. 11A illustrates an output destination selection screen, and FIG. 11B illustrates an output WF selection screen.

DETAILED DESCRIPTION

Hereinafter, an embodiment of this disclosure will be described with appropriate reference to the drawings. The embodiment described below is merely an example of this disclosure, and it is apparent that the embodiment of this disclosure may be appropriately changed within the scope of this disclosure. For example, the execution order of processes to be described below may be appropriately changed within the scope of this disclosure.

Figure 1:
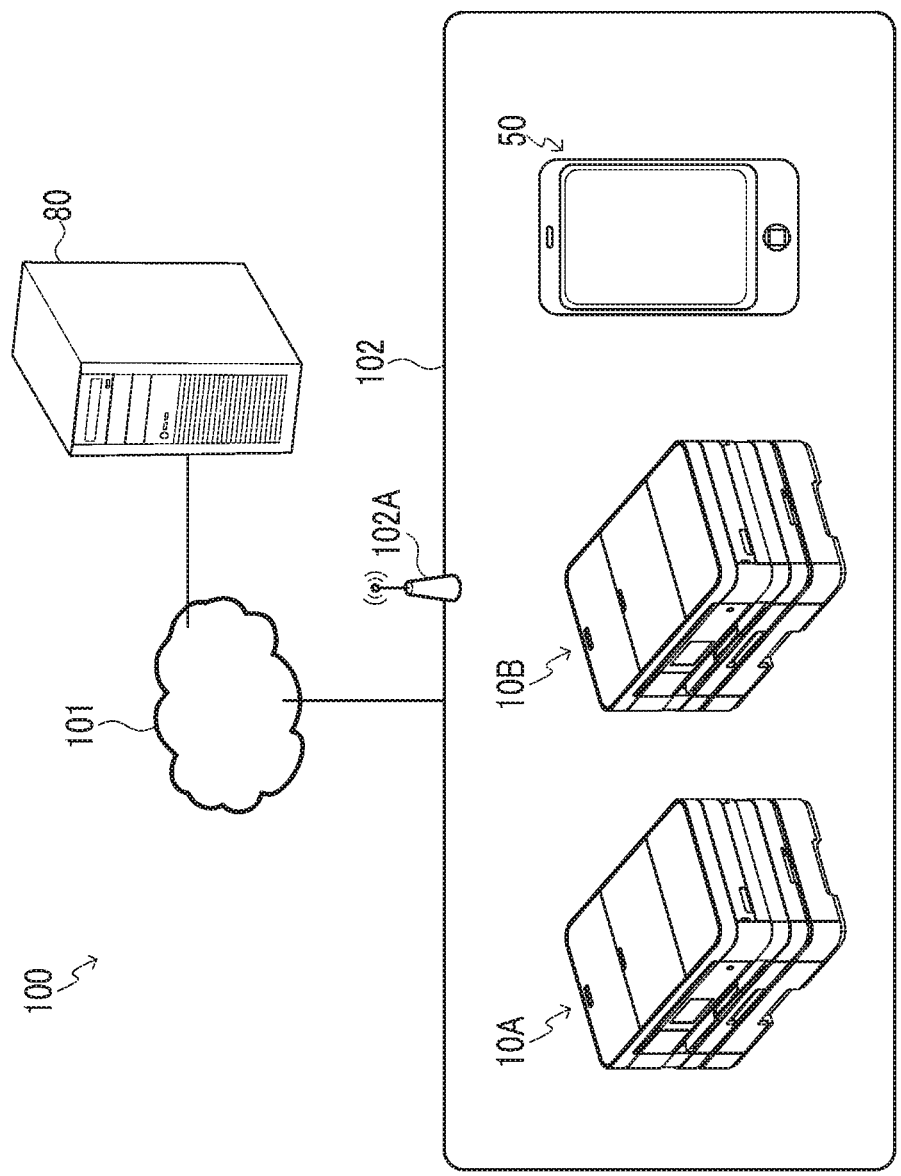
FIG. 1 is a schematic diagram of a system 100 according to this embodiment.
Figure 4A:
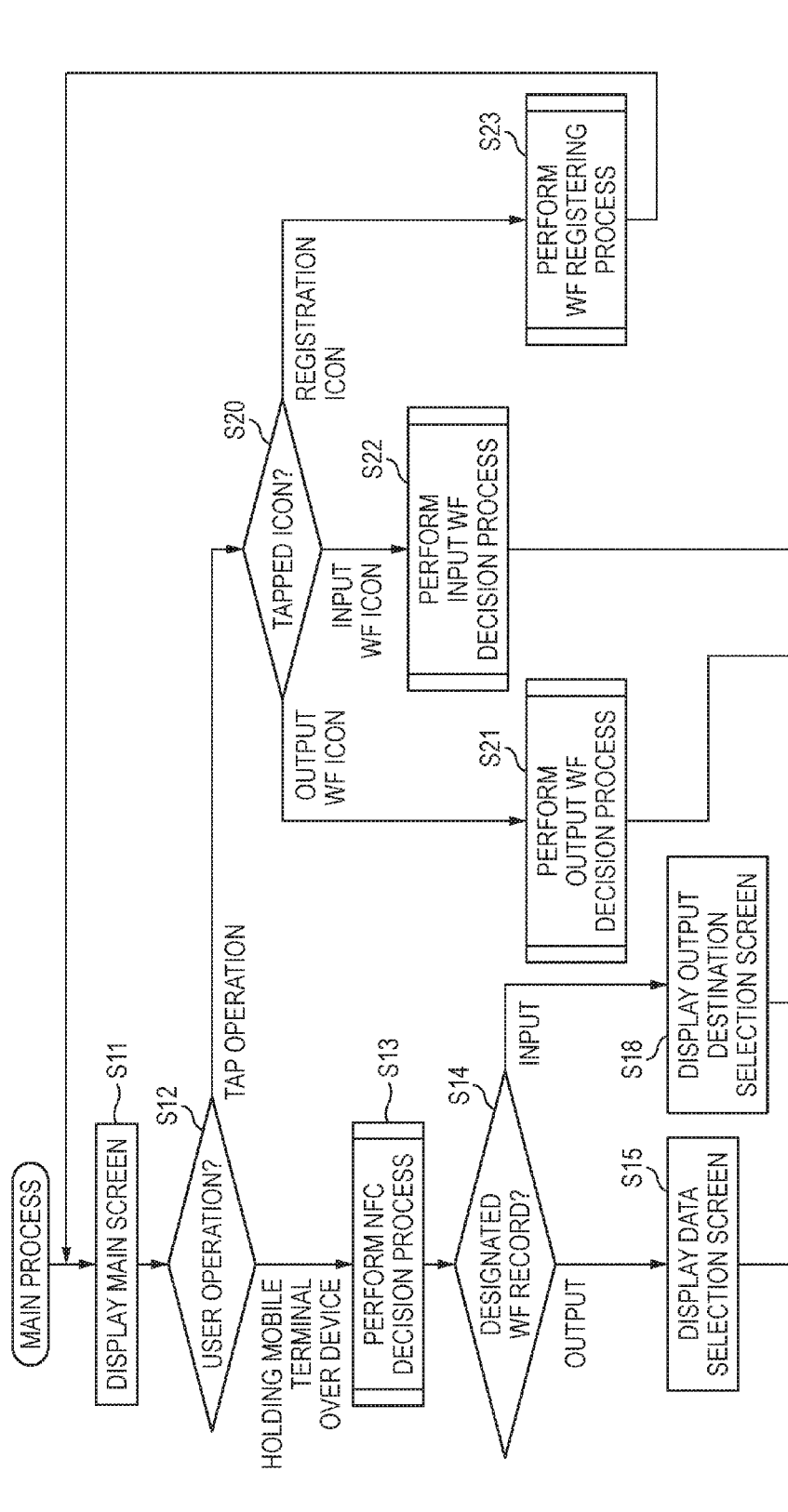
Figure 5A:
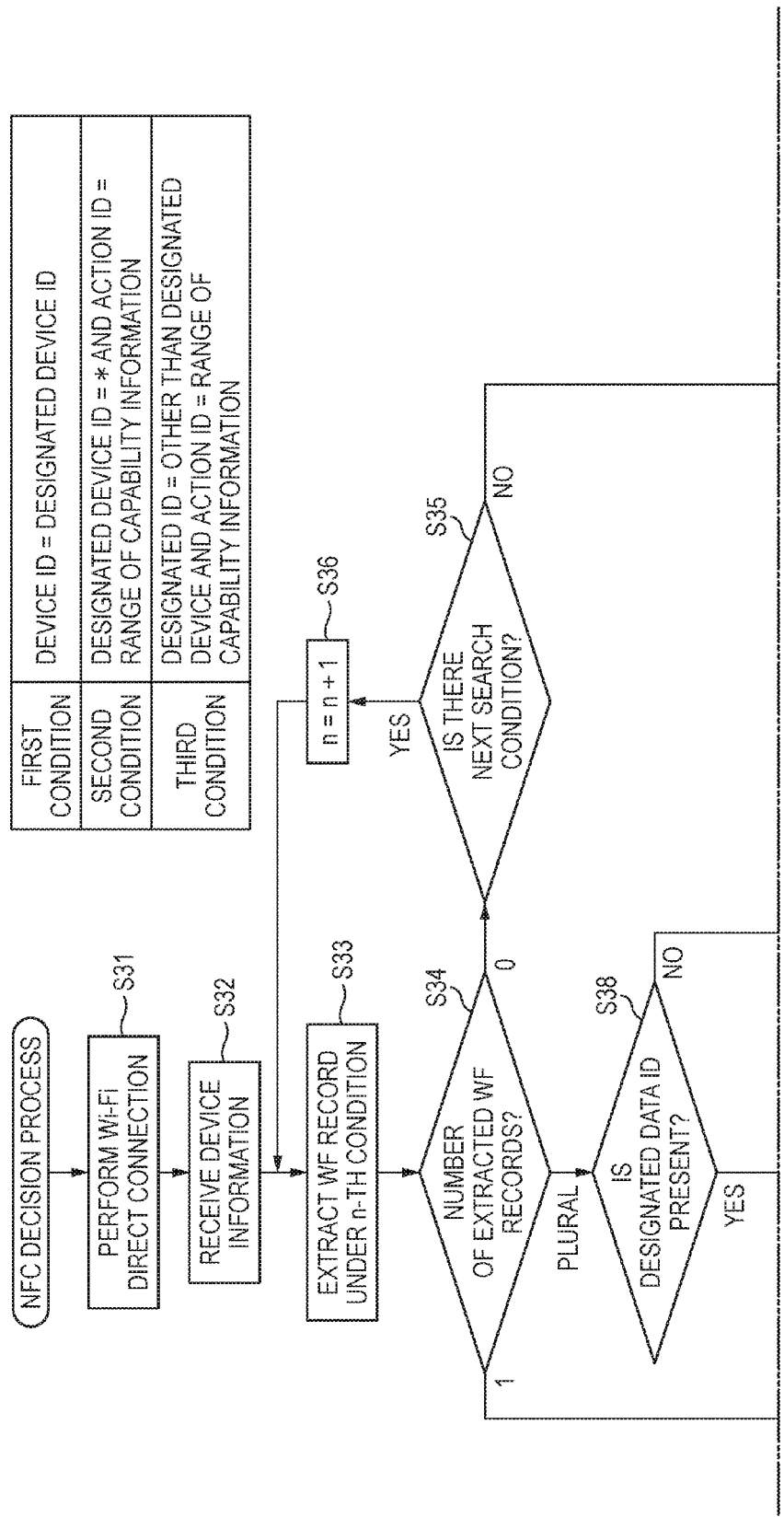
FIGS. 5A and 5B is a flowchart of an NFC deciding process.
Figure 5B:
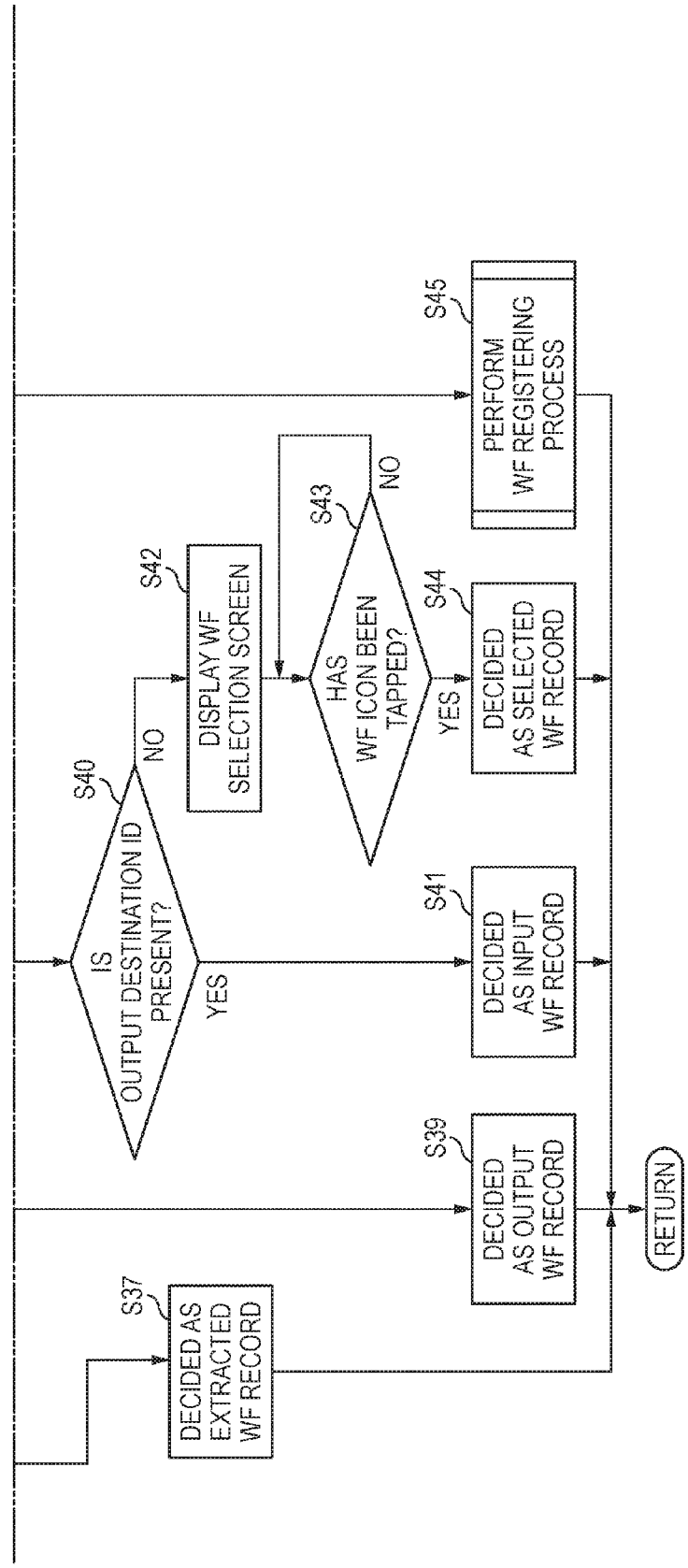

FIG. 1 is a schematic diagram of a system 100 according to this embodiment. The system 100 illustrated in FIG. 1 is configured by multi-function peripherals 10A and 10B (hereinafter, these may be collectively represented as a "multi-function peripheral 10"), a mobile terminal 50, and a server 80. The multi-function peripheral 10, the mobile terminal 50, and the server 80 are able to communicate with each other through a communication network. A specific example of the communication network is not particularly limited but, for example, may be the Internet 101, a wired LAN, a wireless LAN 102, or a combination thereof.

The multi-function peripheral 10 and the mobile terminal 50 belong to the wireless LAN 102. In other words, the multi-function peripheral 10 and the mobile terminal 50 can communicate with each other through an access point, which is not illustrated, of the wireless LAN 102. The wireless LAN 102 is connected to the Internet 101 through a router 102A. The server 80 is connected to the Internet 101. In other words, the multi-function peripheral 10 and the mobile terminal 50 can communicate with the server 80 through the router 102A and the Internet 101.

As illustrated in FIG. 2A, the multi-function peripheral 10 mainly includes: a printer 11; a scanner 12; a display 23; an input I/F 24; an NFC communication I/F 25; a Wi-Fi (a registered trademark) communication I/F 26; a CPU 31; a memory 32; and a communication bus 33. The constituent elements configuring the multi-function peripheral 10 are interconnected through the communication bus 33. The configurations of the multi-function peripheral 10A and 10B may be similar or different from each other. The multi-function peripheral 10 is an example of an image processing apparatus. The printer 11 and the scanner 12 are examples of an action unit.

The printer 11 performs a print action recording an image represented by image data on a sheet. As a recording system of the printer 11, a known system such as an ink jet system or an electrophotographic system may be employed. The scanner 12 performs a scan action generating image data (hereinafter, represented as "scan data") by reading an image recorded in a document. In addition, the multi-function peripheral 10 may further include a fax unit capable of performing a fax transmitting action and a fax receiving action. The multi-function peripheral 10 may include one of the printer 11 and the scanner 12 but not include the other.

The print action is an example of an output action outputting image data. Here, a specific example of the output action is not limited to the print action, and it may be a fax transmitting action for performing fax transmission of image data to an external device, for example. The scan action is an example of an input action generating image data. Here, a specific example of the input action is not limited to the scan action, and it may be a fax receiving action performing fax receiving of image data or the like from an external device.

The input I/F 24 is a user interface that receives a user's input operation. More specifically, the input I/F 24 includes buttons and outputs various operation signals associated with pressed buttons to the CPU 31. In addition, the input I/F 24 may include a touch sensor of a film shape superimposed on a display face of the display 23. An operation designating an object displayed on the display face of the display 23 and an operation of inputting a character string or a number string are examples of a user operation. The term "object", for example, indicates a character string, an icon, a button, a link, or the like displayed on the display 23.

The input I/F 24 realized by a touch sensor outputs positional information representing a position on the display face that is touched by a user. In this description, a term "touch" includes an overall operation of bringing an input medium into contact with the display face. In addition, the term "hovering" or a "floating touch" causing the input medium to approach up to a position with an small distance to the display surface without the input medium not being in contact with the display face may be included in the concept of the term "touch". The input medium may be a user's finger, a touch pen, or the like. A user operation tapping the position of an icon displayed on the display 23 is an example of a designation operation designating the icon.

The NFC communication I/F 25 is an example of a first communication interface that is capable of transmitting/receiving a radio signal to/from an external device. In other words, the multi-function peripheral 10 transmits various kinds of information to the mobile terminal 50 through the NFC communication I/F 25 and receives various kinds of information from the mobile terminal 50 through the NFC communication I/F 25. Here, the communication range of wireless communication through the NFC communication I/F 25 (hereinafter, represented as "NFC communication") is narrower than the communication range of wireless communication through the Wi-Fi communication I/F 26 (hereinafter, represented as "Wi-Fi communication"). The communication speed of the NFC communication is lower than the communication speed of the Wi-Fi communication.

The NFC communication I/F 25 is an interface used for performing wireless communication by using a proximity wireless system. The NFC communication I/F 25 performs wireless communication that is in compliance with the NFC standard. The NFC standard, for example, is a standard of ISO/IEC 21481 or 18092. In this description, a device capable of performing communication in a sequence that is compliance with the NFC standard will be represented as an "NFC device", and communication performed in the sequence compliance with the NFC standard will be represented as "NFC communication". The NFC communication is an example of proximity wireless communication. In the NFC communication I/F 25, an IC chip including a memory storing information to be received/transmitted from/to an external device is mounted. The NFC standard is an example of a proximity wireless communication protocol. Instead of the NFC standard, the TransferJet (a registered trademark) standard may be employed.

The Wi-Fi communication I/F 26 is an example of a second communication interface capable of communicating with an external device. The multi-function peripheral 10 outputs various kinds of information to the mobile terminal 50 through the Wi-Fi communication I/F 26 and receives various kinds of information from the mobile terminal 50 through the Wi-Fi communication I/F 26. The communication distance of the Wi-Fi communication is longer than the communication distance of the NFC communication. The communication speed of the Wi-Fi communication is higher than the communication speed of the NFC communication.

The Wi-Fi communication I/F 26 performs wireless communication that is compliance with the Wi-Fi standard. The Wi-Fi communication I/F 26 is capable of performing indirect wireless communication wirelessly communicating with an external device through a communication network. In more detail, the Wi-Fi communication I/F 26 is capable of performing wireless communication with an external device through a relay device such as an access point. In addition, the Wi-Fi communication I/F 26 may be capable of direct wireless communication performing wireless communication with an external device not through a relay device. The direct wireless communication, for example, is wireless communication that is compliance with the Wi-Fi Direct (a registered trademark) standard. Wireless communication performed not through a relay device among the Wi-Fi communication will be represented as "Wi-Fi Direct communication". While a specific communication protocol of the Wi-Fi communication I/F 26 is not particularly limited, for example, Wi-Fi may be employed for indirect wireless communication, and Wi-Fi Direct may be employed for direct wireless communication.

The CPU 31 controls the overall behavior of the multi-function peripheral 10. The CPU 31 acquires various programs to be described below from the memory 32 based on various kinds of information output from the input I/F 24, various kinds of information received from an external device through the communication I/Fs 25 and 26, and the like and executes the programs. The CPU 31 and the memory 32 configure an example of a controller.

The memory 32 stores an OS 34 and a device program 35. The device program 35 may be a single program or an aggregation of a plurality of programs. The memory 32 stores data, information, or the like that is necessary for the execution of the device program 35. The memory 32, for example, is configured by a RAM, a ROM, an EEPROM, an HDD, a portable storage medium such as a USB memory that is detachably attached to the multi-function peripheral 10, a buffer included in the CPU 31, or the like or a combination thereof.

The memory 32 may be a computer-readable storage medium. The computer-readable storage medium is a non-transitory medium. In the non-transitory medium, in addition to the examples described above, a recording medium such as a CD-ROM or a DVD-ROM is included. The non-transitory medium is also a tangible medium. Meanwhile, while an electric signal carrying a program downloaded from a server on the Internet 101 or the like is a computer-readable signal medium that is one type of computer-readable signal medium, the electric signal is not included in the non-transitory computer-readable storage medium. This similarly applies to the case of the memory 62 of the mobile terminal 50 to be described below.

The memory 32, for example, as illustrated in FIG. 3A, can store device information including an action ID and capability information. The device information includes one set of the action ID and the capability information or more. FIG. 3A illustrates an example of the device information of the multi-function peripheral 10A. While the device information of the multi-function peripheral 10B is not illustrated, the device information may be the same as or different from that of the multi-function peripheral 10A. The device information, for example, is set before shipment by a manufacturer of the multi-function peripheral 10.

The action ID is an example of action identification information to identify an action that is executable for the multi-function peripheral 10. In this embodiment, a print action is identified as "print", and a scan action is identified as "scan". The capability information represents a variation in the execution condition of an operation identified by a corresponding action ID. Size information represents the size of a sheet on which an image is recorded by a print action. Color information represents a color of an image that is recorded on a sheet by a print action. Resolution information represents resolution of scan data that is generated by a scan action. Format information represents the format of scan data that is generated by a scan action.

That is, in the example illustrated in FIG. 3A, the multi-function peripheral 10A can perform a print action for recording an image of "monochrome" or "colors" on a sheet of "A4", "A3", and "L type" and a scan action for generating scan data having resolution of one of "300 dpi" and "600 dpi" in one of file formats "TIFF" and "PDF". The execution conditions represented in the capability information are not limited to those illustrated in the example described above.

The mobile terminal 50, as illustrated in FIG. 2B, mainly includes: a display 53; an input I/F 54; an NFC communication I/F 55; a Wi-Fi communication I/F 56; a CPU 61; a memory 62; and a communication bus 63. The display 53, the input I/F 54, the NFC communication I/F 55, the Wi-Fi communication I/F 56, the CPU 61, the memory 62, and the communication bus 63 included in the mobile terminal 50 have configurations similar to the display 23, the input I/F 24, the NFC communication I/F 25, the Wi-Fi communication I/F 26, the CPU 31, the memory 32, and the communication bus 33 included in the multi-function peripheral 10, and thus, description thereof will not be presented. The CPU 61 and the memory 62 configure an example of a controller.

The mobile terminal 50, for example, is a mobile phone, a smartphone, a tablet terminal, or the like. In more detail, the display 53 of the mobile terminal 50 is configured to have a display screen, preferably of a size of 12 inches or less and, more preferably, of a size of 8 inches or less. The input I/F 54 of the mobile terminal 50 is preferably a touch sensor superimposed on the display screen of the display 53.

The memory 62 stores an OS 64 and a terminal program 65. The OS 64, for example, may be an Android (a registered trademark), iOS (a registered trademark), a Windows Phone (a registered trademark) operating system, or the like.

The memory 62, for example, as illustrated in FIG. 3B, may include a WF (workflow) list. The WF list includes one WF record or more. The WF record includes a WF-ID, a device ID, an action ID, and condition information associated with each other. Here, the WF record may be configured not to include a device ID. When the terminal program 65 is installed, any WF record is not stored in the memory 62. The terminal program 65 registers a WF record generated in accordance with a user's instruction in the WF list in a WF registering processing to be described below.

The WF-ID is an example of WF identification information to identify a WF record. The device ID is an example of device identification information to identify the multi-function peripheral 10. In this embodiment, the multi-function peripheral 10A is identified as "MFP-A", and the multi-function peripheral 10B is identified as "MFP-B". The condition information is information that represents an execution condition of an action identified by a corresponding action ID.

The WF record is an example of workflow information that defines a content of an action to be performed by the multi-function peripheral 10. The workflow represents an action identified by an action ID that is performed according to an execution condition represented by the condition information. As an example, in a WF record having a WF-ID "001", a print action for recording a monochrome image on a sheet of a A4 size is defined as a workflow. As another example, in a WF record having a WF-ID "002", a scan action for generating scan data of resolution of 600 dpi in the TIFF format is defined as a workflow.

A WF record having an action ID of an output action is an example of first workflow information (hereinafter, represented as an "output WF record"), and a workflow defined by the output WF record will be represented as an "output WF". On the other hand, a WF record having an action ID of an input action is an example of second workflow information (hereinafter, represented as an "input WF record"), and a workflow defined by the input WF record will be represented as an "input WF".

In the example illustrated in FIG. 3B, WF records having WF-IDs "001", "003", and "004" are output WF records, and a WF record having a WF-ID "002" is an input WF record. In a WF list according to this embodiment, only one output WF record having a same device ID can be registered, and only one input WF record having a same device ID can be registered. However, the configuration is not limited to such a configuration.

While not illustrated in the drawing, a data folder may be arranged in the memory 62. In the data folder, for example, photograph data, document data, presentation data, table calculation data, and the like may be stored. Various kinds of data stored in the data folder is data that can be designation data.

The server 80 is a so-called storage server. In more detail, the server 80, for example, stores data received from an external device in a server memory and reads data designated by an external device from the server memory and transmits the read data to the mobile terminal 50. In this embodiment, the server 80 is identified as a device ID "server C". The server 80, for example, may be configured to provide services such as "Evernote (a registered trademark)", "Dropbox (a registered trademark)", and "Google Drive (Google is a registered trademark)".

The NFC communication I/F 55 of the mobile terminal 50 according to this embodiment perform a poll action. The poll action is an action of repeatedly outputting a polling signal at a predetermined time interval and monitoring a response signal that is a response to the polling signal. Meanwhile, the NFC communication I/F 25 of the multi-function peripheral 10 according to this embodiment performs a listen action. The listen action is an action of monitoring a polling signal and outputting a response signal on condition of reception of the polling signal.

As the multi-function peripheral 10 and the mobile terminal 50 approach each other, the NFC communication I/F 25 of the multi-function peripheral 10 receives a polling signal output from the NFC communication I/F 55 of the mobile terminal 50, and the NFC communication I/F 55 of the mobile terminal 50 receives a response signal output from the NFC communication I/F 25 of the multi-function peripheral 10. In this way, in a predetermined sequence compliant with the NFC standard, a communication link (hereinafter, represented as an "NFC link") of an NFC system is set up between the multi-function peripheral 10 and the mobile terminal 50. Thereafter, the multi-function peripheral 10 and the mobile terminal 50 perform transmission/reception of information and the like through this NFC link. It may be configured such that the multi-function peripheral 10 performs a poll action, and the mobile terminal 50 performs a listen action.

[Behavior of System 100]

The behavior of the system 100 according to this embodiment will be described with reference to FIGS. 4 to 7. At a start time point of a processing illustrated in FIG. 4, the NFC communication I/F 25 of the multi-function peripheral 10 is assumed to have already performed a listen action, and the NFC communication I/F 55 of the mobile terminal 50 is assumed to perform a poll action.

Flowcharts of this disclosure, basically, illustrates the processes of the CPUs 31 and 61 according to a command described in a program. In other words, in description presented below, processes such as "determination", "extraction", "selection", "calculation", "decision", "specifying", and "control" represent the processes of the CPUs 31 and 61. The processes of the CPU 61 include hardware control performed through the OS 64. In this description, term "data" is represented by a computer-readable bit string. "Data" having a substantially same semantic content and having a different format will be handled as same data. This interpretation is similarly applied to term "information" in this disclosure.

First, the terminal program 65 displays a main screen illustrated in FIG. 8A on the display 53 (S11). The main screen includes a message "Please Tap icon or Hold Terminal over Device!", an [OUTPUT WF] icon 111, an [INPUT WF] icon 112, and a [REGISTRATION] icon 113. The [OUTPUT WF] icon 11 corresponds to an execution instruction for an output WF deciding processing, the [INPUT WF] icon 112 corresponds to an execution instruction for an input WF deciding processing, and the [REGISTRATION] icon 113 corresponds to an execution instruction for a WF registering processing. Then, the terminal program 65 receives a user operation for the main screen through the input I/F 54 or the NFC communication I/F 55 (S12).

For example, as the user allows the mobile terminal 50 to approach the multi-function peripheral 10A, the terminal program 65 receives a response signal from the multi-function peripheral 10A through the NFC communication I/F 55 that is being performing a poll action (S12: holding the mobile terminal over the device). Next, the terminal program 65 sets up an NFC link with the multi-function peripheral 10A that is a transmission source of the response signal. The receiving of a response signal from the multi-function peripheral 10A or the setting up of an NFC link is an example of a proximity wireless connection between the NFC communication I/F 55 and the multi-function peripheral 10A.

Then, the terminal program 65 specifies the multi-function peripheral 10A that is being in proximity wireless connection as a designated device. In more details, the terminal program 65 receives a device ID "MFP-A" from the multi-function peripheral 10A being in proximity wireless connection through the NFC communication I/F and stores the received device ID in the memory 62 as a designated device ID. This processing is an example of a specifying processing. The designated device ID is an example of designated device identification information. The operation of allowing the mobile terminal 50 to approach a range in which NFC communication with the multi-function peripheral 10A can be performed is an example of an operation of designating the multi-function peripheral 10A as a designated device through the NFC communication I/F 55.

In addition, the terminal program 65 performs an NFC deciding processing (S13). The NFC deciding processing is a processing of deciding a WF record (hereinafter, represented as a "designated WF record") defining a workflow to be performed by the designated device that is being in proximity wireless connection. The NFC deciding processing will be described in detail with reference to FIG. 5.

First, the terminal program 65 receives connection information from the multi-function peripheral 10A that is being in proximity wireless connection through the NFC communication I/F 55. The connection information is information that is necessary for a Wi-Fi direct connection with the multi-function peripheral 10A. The connection information, for example, may be an IP address, a MAC address, an SSID, or the like. Then, the terminal program 65 performs a Wi-Fi Direct connection with the multi-function peripheral 10A by using the received connection information (S31).

Next, the terminal program 65 receives device information from the multi-function peripheral 10A through the Wi-Fi communication I/F 56 that is connected by Wi-Fi Direct (S32). Then, the terminal program 65 temporarily stores the received device information in the memory 62 in association with the designated device ID. The terminal program 65 may be configured to receive both the connection information and the device information from the multi-function peripheral 10A through the NFC communication I/F 55 in S31. The processing of receiving the connection information and the device information is an example of reception processing.

Next, the terminal program 65 extracts WF records coinciding with a first condition among WF records included in the WF list (S33). Then, the terminal program 65 determines the number of the WF records extracted in S33 (S34). In response to a determination that there is no WF record coinciding with the first condition (S34: 0), the terminal program 65 determines whether or not any other search condition is present (S35). Then, in response to a determination that a second search condition is present (S35: Yes), the terminal program 65 extracts WF records coinciding with the second condition (S36→S33). In addition, in response to a determination that there is no WF record coinciding with the second condition (S34: 0), the terminal program 65 extracts WF records coinciding with a third condition (S35: Yes S36 S33). The processing of S33 is an example of an extraction processing.

The first condition according to this embodiment is a condition where the WF record includes the designated device ID. The second condition according to this embodiment is a condition where the WF record does not include the device ID but include the action ID included in the device information received in S32. The third condition according to this embodiment is a condition where the WF record includes a device ID other than designated device ID and includes the action ID included in the device information received in S32.

However, the execution sequence of the extraction processes with using the extraction conditions is not limited to that described in the example described above. For example, in the first processing of S33, WF records coinciding with the second condition may be configured to be extracted. In such a case, the extraction processing using the first condition and the extraction processing using the third condition may be omitted. The extraction condition used in S33 is not limited to that described in the example described above. As an example, the extraction condition used in S33 of the NFC deciding processing performed in S76 may be a condition where the WF record includes the designated device ID and the action ID of the output action. As another example, the extraction condition used in S33 in the NFC deciding processing performed in S86 may be a condition where the WF record include the designated device ID and the action ID of the input action.

In the WF list illustrated in FIG. 3B, in a case where the designated device ID is "MFP-A", WF records respectively having WF-IDs "001" and "002" coincide with the first condition, a WF record having a WF-ID "003" coincides with the second condition, and a WF record having a WF-ID "004" coincides with the third condition. On the other hand, in a case where a multi-function peripheral 10C, which is not illustrated in the drawing, identified as a device ID "MFP-C" is newly installed, and the mobile terminal 50 is held over the multi-function peripheral 10C, the WF records do not coincide with any of the extraction conditions. In this embodiment, the following description will be continued with WF records having WF-IDs "001" and "002" assumed to be extracted.

In response to a determination that a plurality of WF records are extracted in S33, in other words, in response to a determination that both the output WF record and the input WF record are extracted in S33 (S34: two or more), the terminal program 65 determines whether or not a designated data ID is stored in the memory 62 and determines whether or not an output destination ID is stored in the memory 62 (S38 & S40). The processing of S38 and S40 is an example of a determination processing. The execution sequence of S38 and S40 is not limited to that described in the example of FIG. 5 but may be reversed.

The designated data ID is an example of data identification information to identify designated data that is a target for the output action. The designated data ID is stored in the memory 62 in S72 to be described below. In other words, the terminal program 65 determines whether or not the processing of S72 has been performed in S38. The output destination ID is output destination identification information to identify a designated output destination that is an output destination of generated data that is generated by the input action. The output destination ID is stored in the memory 62 in S82 to be described below. In other words, the terminal program 65 determines whether or not the processing of S82 has been performed in S40.

Then, in response to a determination that the designated data ID is stored in the memory 62, in other words, in response to a determination that the processing of S72 has been performed (S38: Yes), the terminal program 65 decides the output WF record extracted in S33 as a designated WF record (S39). In other words, the terminal program 65 temporarily stores a WF-ID "001" of the designated WF record in the memory 62. In a case where a plurality of output WF records are extracted in S33, the terminal program 65 may be configured to decide a designated WF record in accordance with a user operation through an output WF selection screen to be described below.

On the other hand, in response to a determination that the output destination ID is stored in the memory 62, in other words, in response to a determination that the processing of S82 has been performed (S40: Yes), the terminal program 65 decides the input WF record extracted in S33 as a designated WF record (S41). In other words, the terminal program 65 temporarily stores a WF-ID "002" of the designated WF record in the memory 62. In a case where a plurality of input WF records are extracted in S33, the terminal program 65 may be configured to decide a designated WF record in accordance with a user operation through an input WF selection screen to be described below.

In addition, in response to a determination that none of the designated data ID and the output destination ID is stored in the memory 62, in other words, in response to a determination that none of the processes of S72 and S82 has not been performed (S38: No & S40: No), the terminal program 65 displays a WF selection screen illustrated in FIG. 8B on the display 53 (S42). Then, the terminal program 65 receives a user operation for the WF selection screen through the input I/F 54 (S43). The processing of S43 is an example of a third operation reception processing.

The WF selection screen is a screen urging to select one of the plurality of WF records extracted in S33. The WF selection screen includes WF icons 121 and 122 corresponding to the WF records extracted in S33. The WF icon 121 corresponds to a WF record having a WF-ID "001", and the WF icon 122 corresponds to a WF record having a WF-ID "002". In each of the WF icons 121 and 122, the content of a workflow defined in a corresponding WF record is described.

Then, in response to the reception of the user operation designating one of the WF icons 121 and 122 through the input I/F 54 (S43: Yes), the terminal program 65 decides a WF record corresponding to the designated WF icon as a designated WF record (S44). In other words, the terminal program 65 temporarily stores a WF-ID of the designated WF record in the memory 62.

On the other hand, in response to a determination that the number of the WF record extracted in S33 is one (S34: one), the terminal program 65 decides the WF record as a designated WF record (S37). In other words, the terminal program 65 temporarily stores a WF-ID of the designated WF record in the memory 62. In addition, in response to a determination that any WF record coinciding any one of the plurality of extraction conditions is not registered in the WF list (S35:

No), the terminal program 65 performs a WF registering processing (S45). The WF registering processing is a processing of registering a new WF record in the WF list. The WF registering processing will be described in detail with reference to FIG. 6.

First, the terminal program 65 determines whether or not the designated device ID is stored in the memory 62 (S51). Then, in response to a determination that the designated device ID "001" is stored in the memory 62 (S51: Yes), the terminal program 65 decides the designated device ID "MFP-A" as a device ID to be included in the new WF record (S52).

On the other hand, in response to a determination that the designated device ID is not stored in the memory 62 (S51: No), the terminal program 65 displays a device selection screen illustrated in FIG. 9A on the display 53 (S53). The device selection screen is a screen urging to designate a device ID to be included in the new WF record. The device selection screen includes device icons 131 and 132 and a [SKIP] icon 133. Then, the terminal program 65 receives a user operation for the device selection screen through the input I/F 54 (S54).

The device icons 131 and 132 respectively correspond to the multi-function peripherals 10A and 10B that can be designated devices. The terminal program 65 may search for the multi-function peripheral 10 belonging to the wireless LAN 102 by using a protocol such as an SNMP and receive a device ID and device information from the found multi-function peripheral 10 through the Wi-Fi communication I/F 26. Here, the [SKIP] icon 133 corresponds to an instruction not designating a designated device.

Next, for example, in response to reception of designation of the device icon 131 through the input I/F 54 (S54: device icon), the terminal program 65 decides a device ID "MFP-A" of the multi-function peripheral 10A corresponding to the designated device icon 131 as a device ID to be included in the new WF record (S55). In other words, the terminal program 65 temporarily stores the device ID and the device information of the multi-function peripheral 10A in the memory 62. On the other hand, in response to reception of designation of the [SKIP] icon 133 through the input I/F 54 (S54: SKIP icon), the terminal program 65 decides that any device ID is not included in the new WF record (S56).

Next, the terminal program 65 determines the number of action IDs included in the device information stored in the memory 62 in association with the device ID, which is decided to be included in the new WF record (S57). Then, in response to a determination that only one action ID is included in the device information (S57: one), the terminal program 65 decides the device ID as an action ID to be included in the new WF record (S58).

Figure 9B:
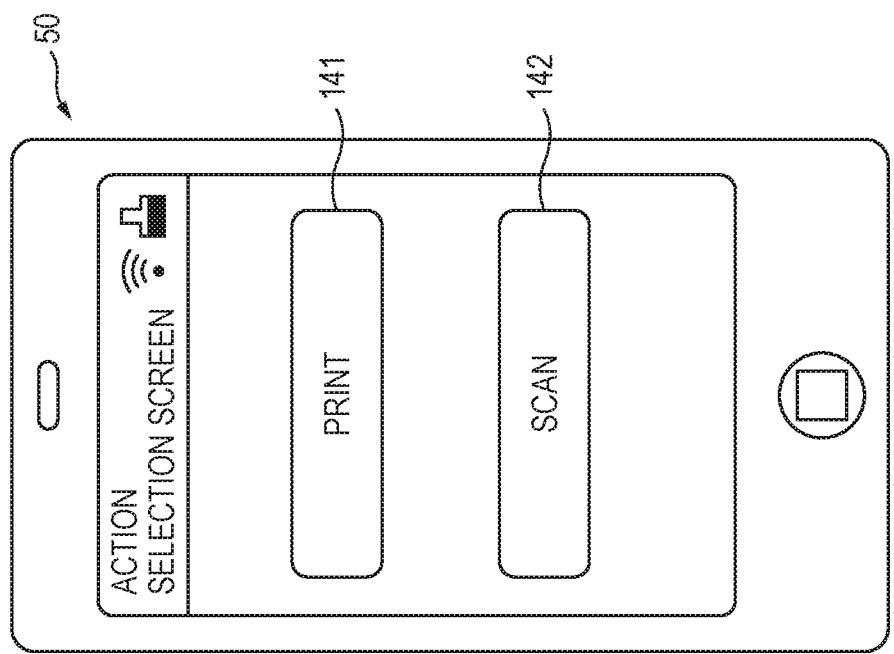
FIGS. 9A and 9B illustrate examples of display of the display 53.
Figure 9A:
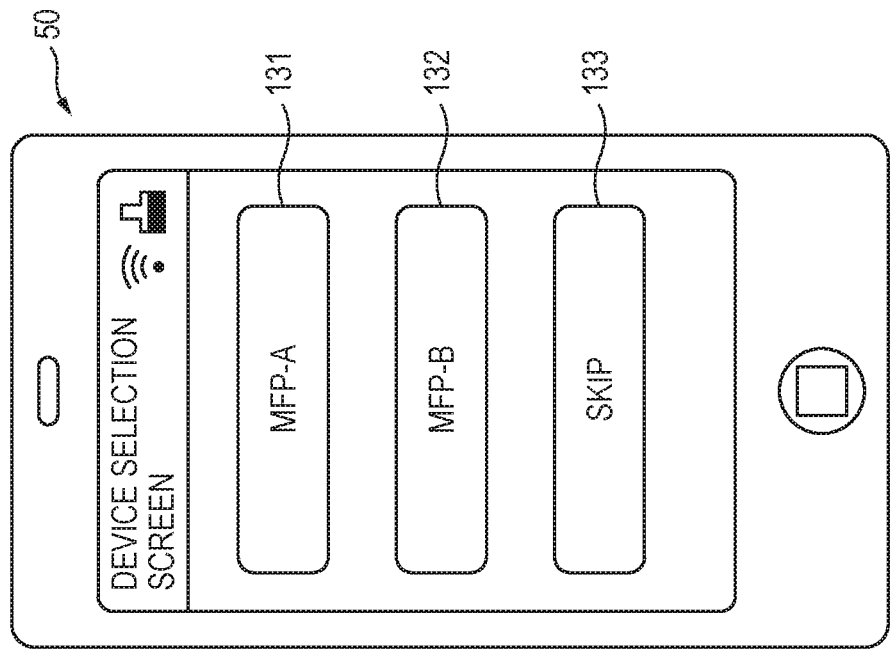

On the other hand, in response to a determination that a plurality of action IDs are included in the device information (S57: two or more), the terminal program 65 displays an action selection screen illustrated in FIG. 9B on the display 53 (S59). The action selection screen is a screen urging to designate an action ID to be included in the new WF record. The action selection screen includes action icons 141 and 142 corresponding to action IDs included in the device information. The operation icon 141 corresponds to a print action, and the action icon 142 corresponds to a scan action. In response to no storage of the device information in S56 (S57: 0), the terminal program 65 displays an action selection screen including a plurality of action icons corresponding to action determined in advance on the display 53 (S59). Then, the terminal program 65 receives a user operation for the action selection screen through the input I/F 54 (S60).

Next, for example, in response to receiving of designation of the action icon 141 through the input I/F 54 (S60: Yes), the terminal program 65 decides the action ID "print" of a print action corresponding to the designated action icon 141 as an action ID to be included in the new WF record (S61). In other words, the terminal program 65 temporarily stores the action ID "print" in the memory 62. The processing of S57 to S61 is an example of a decision processing deciding an action ID to be included in the new WF record.

Figure 10A:
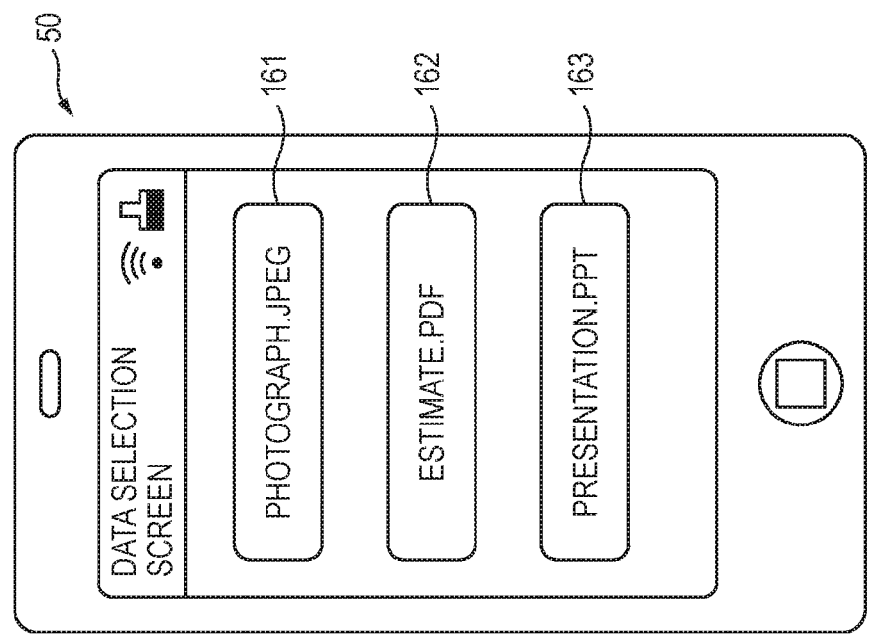
FIGS. 10A and 10B illustrate examples of display of the display 53.

Next, the terminal program 65 displays a setting screen illustrated in FIG. 10A on the display 53 (S62). The setting screen is a screen urging to designate an execution condition of the action identified by the action ID decided in S57 to S61. The setting screen includes check boxes 151, 152, 153, 154, and 155 respectively corresponding to one of execution conditions and a [DECISION] icon 156. Then, the terminal program 65 receives a user operation for the setting screen through the input I/F 54 (S63).

FIG. 10A is an example of the setting screen in a case where it is decided that a device ID "MFP-A" is included in the new WF record in S52 and S55. On the setting screen, check boxes 151 to 155 correspond to execution conditions represented by capability information of the device information stored in the memory 62 in association with the device ID "MFP-A". In other words, in S62 and S63 in a case where the processing of S52 and S55 is performed, designation of an execution condition can be received within the limits of the capability information. While not illustrated in the drawing, on the setting screen in a case where the processing of S56 is performed, check boxes corresponding to execution conditions determined in advance are displayed. A [DECISION] icon 156 corresponds to a registration instruction for the WF record.

Then, in response to receiving of designation of the [DECISION] icon 156 through the input I/F 54 (S63: Yes), the terminal program 65 decides to include condition information representing an execution condition corresponding to a checked check box in a new WF record. In other words, the terminal program 65 temporarily stores the condition information in the memory 62.

Then, the terminal program 65 registers the WF record having a newly numbered WF-ID, the device ID decided in S52 and S53, the action ID decided in S58 and S61, and the condition information decided in S63 in the WF list (S64). On the other hand, in S64 in a case where the processing of S56 is performed, the terminal program 65 registers a WF record having the action ID and the condition information but not having a device ID in the WF list. The processing of S64 is an example of a storage processing.

In addition, the terminal program 65 may determine a trigger for the WF registering processing. Then, in a case where it is determined that the WF registering processing is performed in S45, the terminal program 65 may decide the WF record registered in the WF list in S64 as a designated WF record. On the other hand, in a case where it is determined that the WF registering processing is performed in S23, the terminal program 65 may not decide a designated WF record. In addition, in a case where it is determined that the WF registering processing is performed in S23 and where it is determined that the device ID is included in the WF record registered in the WF list in S64, the terminal program 65 may decide the WF record registered in the WF list in S64 as a designated WF record. Furthermore, the terminal program 65 may decide whether the WF record registered in the WF list in S64 is set as a designated WF record in accordance with a user operation performed through the input I/F 54.

Next, referring back to FIG. 4, in the NFC decision processing (S13), the terminal program 65 determines whether the output WF record or the input WF record is decided as the designated WF record (S14). In response to a determination that the output WF record is determined as the designated WF record (S14: output), the terminal program 65 displays a data selection screen illustrated in FIG. 10B on the display 53 (S15). The data selection screen is a screen urging to designate designated data. The data selection screen includes data icons 161, 162, and 163. The data icons 161, 162, and 163, for example, correspond to data stored in a data folder or data stored in the server memory of the server 80. Then, the terminal program 65 receives a user operation for the data selection screen through the input I/F 54 (S16).

Next, for example, in response to receiving of designation of the data icon 161 through the input I/F 54 (S16: Yes), the terminal program 65 decides data "photograph.JPEG" corresponding to the data icon 161 as designated data. In other words, the terminal program 65 temporarily stores a data ID of the designated data "photograph.JPEG" in the memory 62 as designated data ID. The processing of S16 is an example of a first operation reception processing. Then, the terminal program 65 transmits execution instruction information to the multi-function peripheral 10A that is the designated device through the Wi-Fi communication I/F 56 connected by Wi-Fi Direct (S17). The execution instruction information of this case is information that is used to instruct the execution of the output WF defined in the designated WF record. This processing is an example of a first execution instruction processing.

In a case where the output WF record having a WF-ID "001" is the designated WF record, the execution instruction information is information used to instruct, to the designated device, the execution of the output WF for recording an image represented by the designated data "photograph.JPEG" on a sheet of the A4 size as a monochrome image. The execution instruction information of this case includes the designated data, and the action ID and the condition information included in the designated WF record. While not illustrated in the drawing, the device program 35 of the multi-function peripheral 10A receives the execution instruction information from the mobile terminal 50 through the Wi-Fi communication I/F 56 connected by Wi-Fi Direct. Then, the device program 35 that has received the execution instruction information described above causes the printer 11 to perform the output WF in accordance with the execution instruction information.

In response to a determination that the input WF record is decided as the designated WF record (S14: input), the terminal program 65 displays an output destination selection screen illustrated in FIG. 11A on the display 53 (S18). The output destination selection screen is a screen urging to designate designated output destination. The output destination selection screen includes output destination icons 171, 172, and 173. The output destination icon 171 corresponds to the memory 62 of the mobile terminal 50, the output destination icon 172 corresponds to the server 80, and the output destination icon 173 corresponds to the multi-function peripheral 10B. Then, the terminal program 65 receives a user operation for the output destination selection screen through the input I/F 54 (S19).

Next, for example, in response to receiving of designation of the output destination icon 172 through the input I/F 54 (S19: Yes), the terminal program 65 decides the server 80 corresponding to the output destination icon 172 as the designated output destination. In other words, the terminal program 65 temporarily stores the device ID "server C" of the designated output destination in the memory 62 as the output destination ID. The processing of S19 is an example of a second operation reception processing. Then, the terminal program 65 transmits execution instruction information to the multi-function peripheral 10A that is the designated device through the Wi-Fi communication I/F 56 connected by Wi-Fi Direct (S17). The execution instruction information of this case is information that is used to instruct the execution of the input WF defined in the designated WF record. This processing is an example of a second execution instruction processing.

In a case where the input WF record having a WF-ID "002" is the designated WF record, the execution instruction information is information used to instruct, to the designated device, the execution of the input WF for transmitting scan data with 600 dpi in the form of TIFF to the server 80 that is the designated output destination. The execution instruction information of this case includes the action ID and the condition information included in the designated WF record and the output destination ID. While not illustrated in the drawing, the device program 35 of the multi-function peripheral 10A receives the execution instruction information from the mobile terminal 50 through the Wi-Fi communication I/F 56 connected by Wi-Fi Direct. Then, the device program 35 that has received the execution instruction information causes the scanner 12 to perform the input WF in accordance with the execution instruction information.

In response to the receiving of designation of the [OUTPUT WF] icon 111 included in the main screen through the input I/F 54 (S12: tap operation & S20: output WF icon), the terminal program 65 performs an output WF decision processing (S21). The output WF decision processing is a processing of deciding one of output WF records registered in the WF list as a designated WF record. The output WF decision processing will be described in detail with reference to FIG. 7A.

Figure 10B:
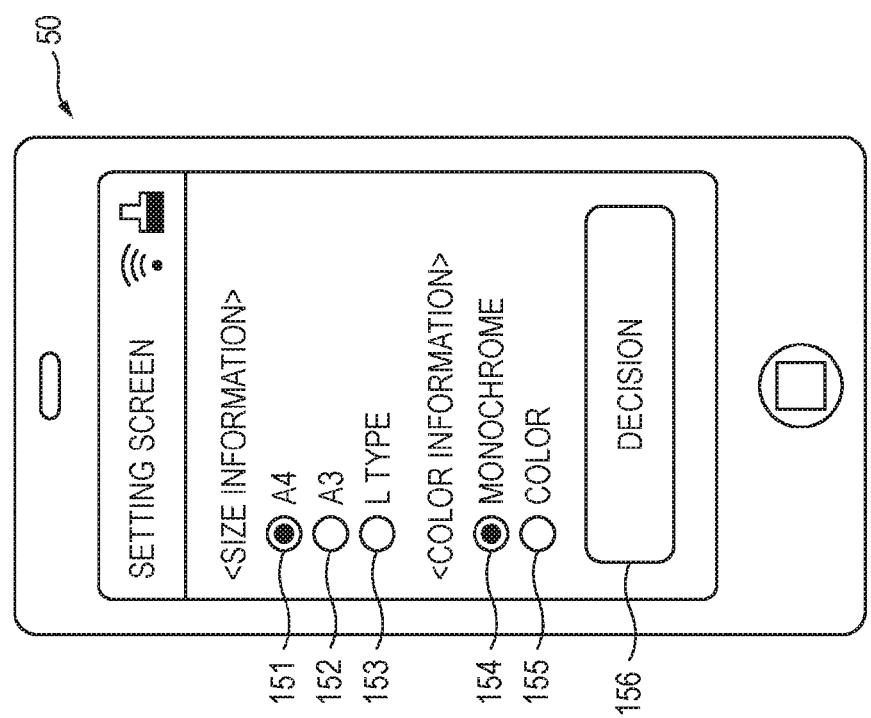

First, the terminal program 65 displays a data selection screen illustrated in FIG. 10B on the display 53 (S71). Then, for example, in response to the receiving of designation of the data icon 162 through the input I/F 54 (S72: Yes), the terminal program 65 decides data "estimate.PDF" corresponding to the data icon 162 as designated data. In other words, the terminal program temporarily stores a data ID of the data "estimate.PDF" in the memory 62 as a designated data ID. The processing of S71 and S72 may be similar to that of S15 and S16.

Next, the terminal program 65 displays an output WF selection screen illustrated in FIG. 11B on the display 53 (S73). The output WF selection screen is a screen urging designation of one output WF record. The output WF selection screen includes a message "Please Tap icon or Hold Terminal over Device!" and WF icons 181 and 182 corresponding to the output WF records including the action IDs but does not include an WF icon corresponding to the input WF record. The WF icon 181 corresponds to an output WF record having a WF-ID "001", and the WF icon 182 corresponds to an output WF record having a WF-ID "004". Then, the terminal program 65 receives a user operation for the output WF selection screen through the input I/F 54 or the NFC communication I/F 55 (S74).

Next, for example, in response to the receiving of designation of the WF icon 181 through the input I/F 54 (S74: WF icon), the terminal program 65 decides an output WF record corresponding to the WF icon 181 as a designated WF record (S75). In addition, the terminal program 65 decides a device ID included in the designated WF record as a designated device ID. In other words, the terminal program 65 temporarily stores the WF-ID of the designated WF record in the memory 62.

Meanwhile, for example, as the user allows the mobile terminal 50 to approach the multi-function peripheral 10A, the terminal program 65 receives a response signal from the multi-function peripheral 10A through the NFC communication I/F 55 that is being performing a poll action (S74: holding the mobile terminal over the device). Next, the terminal program 65 sets up an NFC link with the multi-function peripheral 10A that is a transmission source of the response signal. Then, the terminal program 65 specifies the multi-function peripheral 10A that is being in proximity wireless connection as a designated device. Such a processing may be similarly performed in the case of proximity wireless connection with the multi-function peripheral 10A in S12. Then, the terminal program 65 performs an NFC decision processing (S76).

In response to the receiving of designation of the [INPUT WF] icon 112 included in the main screen through the input I/F 54 (S12: tap operation & S20: input WF icon), the terminal program 65 performs an input WF decision processing (S22). The input WF decision processing is a processing of deciding one of input WF records registered in the WF list as a designated WF record. The input WF decision processing will be described in detail with reference to FIG. 7B.

First, the terminal program 65 displays an output destination selection screen illustrated in FIG. 11A on the display 53 (S81). Then, for example, in response to the receiving of designation of the output destination icon 173 through the input I/F 54 (S82: Yes), the terminal program 65 decides the multi-function peripheral 10B corresponding to the output destination icon 173 as a designated output destination. In other words, the terminal program temporarily stores a device ID "MFP-B" of the multi-function peripheral 10B in the memory 62 as an output destination ID. The processing of S81 and S82 may be similar to that of S18 and S19.

Next, the terminal program 65 displays an input WF selection screen not illustrated in the drawing on the display 53 (S83). The input WF selection screen is a screen urging designation of one input WF record. The input WF selection screen is different from the output WF selection screen illustrated in FIG. 11B in that the input WF selection screen includes WF icons corresponding to input WF records included in the WF list but does not include any WF icon corresponding to the output WF record and is common to the output WF selection screen in other points. The processing of S84 and subsequent steps is common to the processing of S74 and subsequent steps.

In other words, in response to the designation of the [OUTPUT WF] icon 111 or the [INPUT WF] icon 112, the terminal program 65 performs one of the processes S21 and S22. Then, the terminal program 65 causes the designated device to perform a workflow defined in a designated WF record decided in one of the processes S21 and S22. The processing of S17 is an example of an execution instruction processing.

Figure 6A:
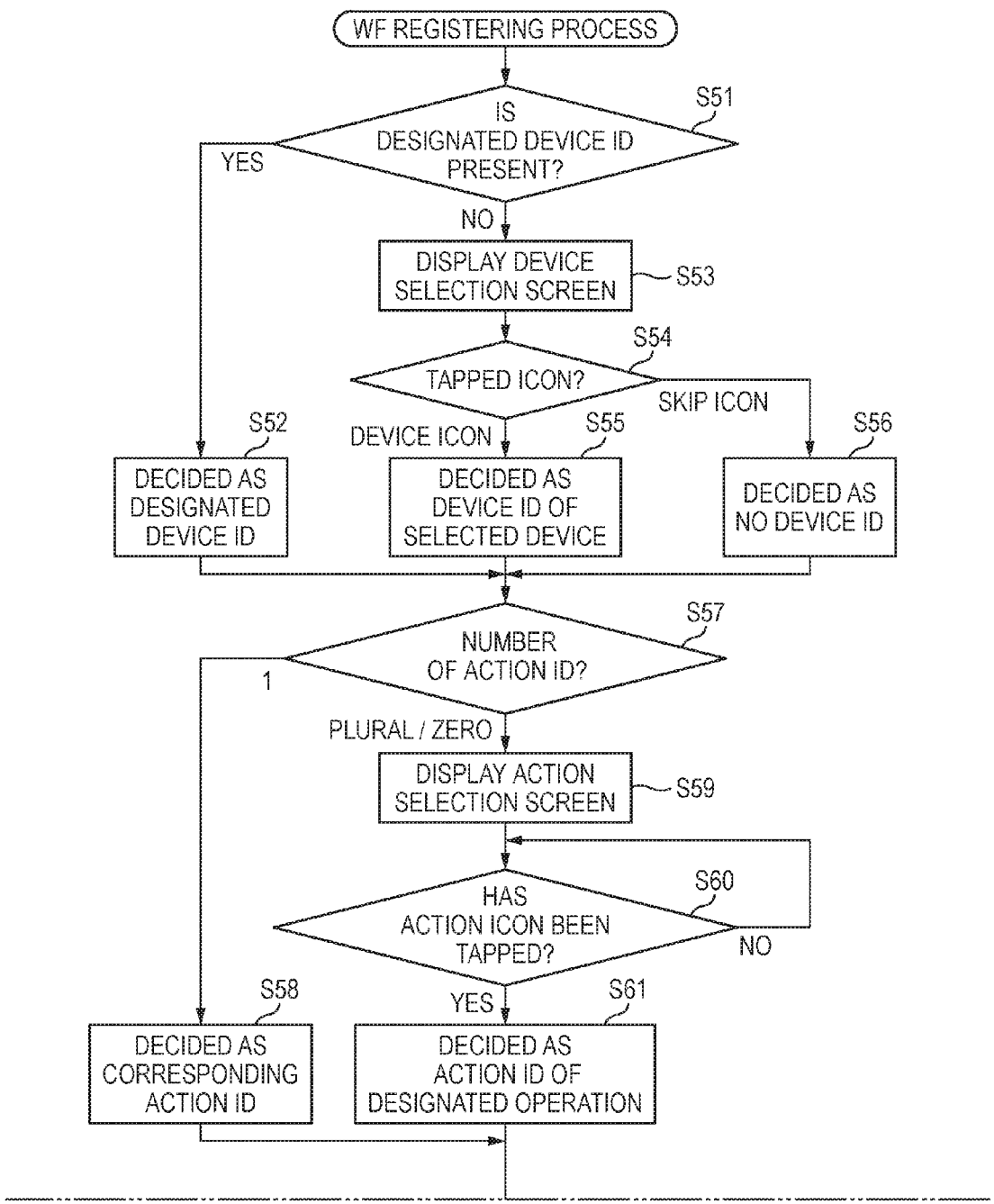
FIGS. 6A and 6B is a flowchart of a WF registering process.
Figure 6B:
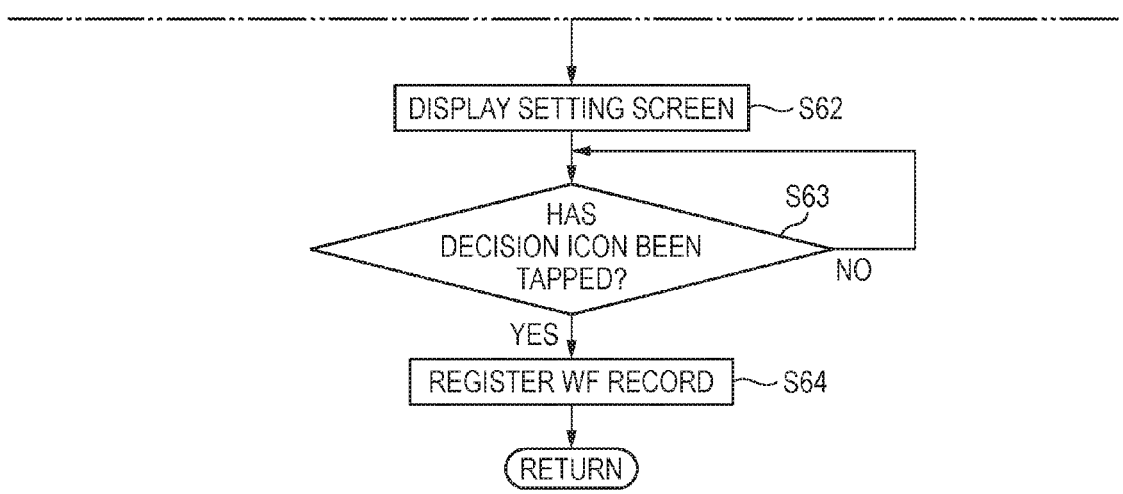
Figure 7B:
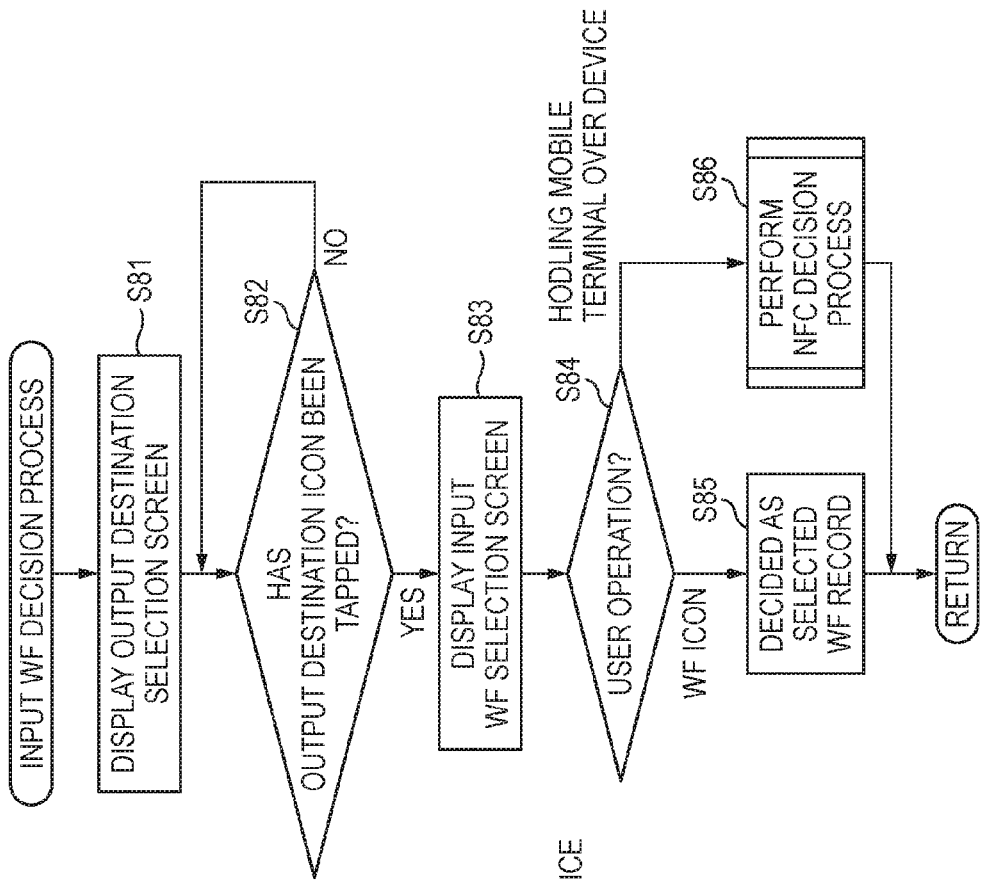
FIG. 7B is a flowchart of an input WF deciding process.
Figure 7A:
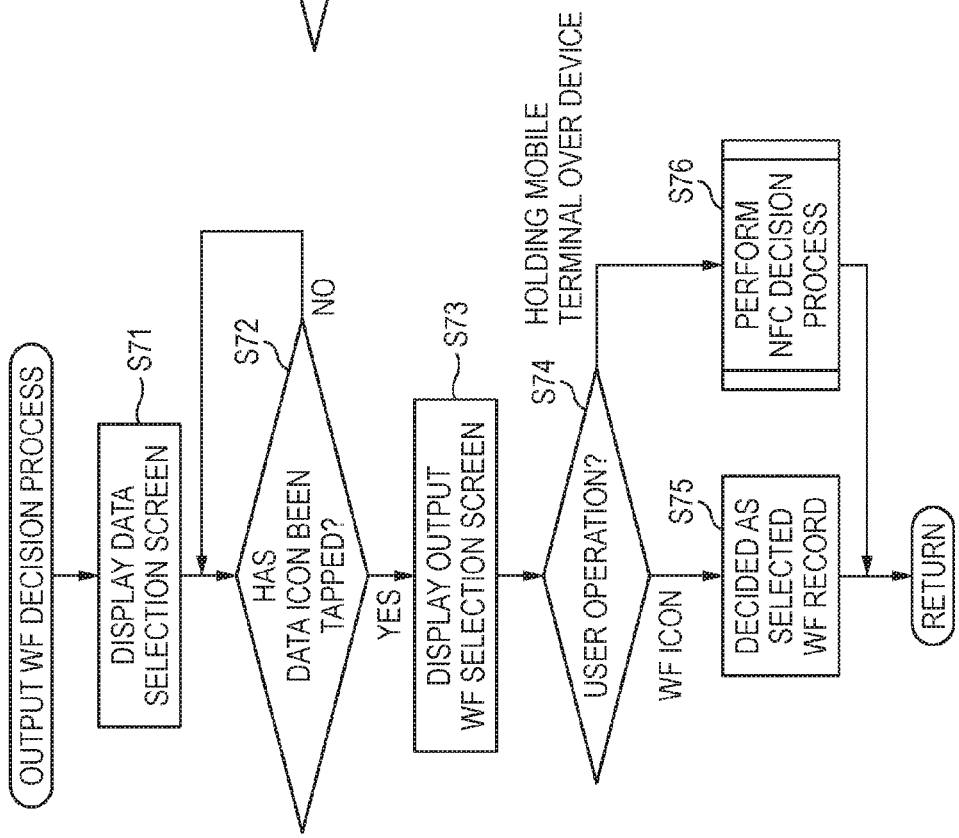
FIG. 7A is a flowchart of an output WF deciding processing.

In addition, in response to the receiving of designation of the [REGISTRATION] icon 113 included in the main screen through the input I/F 54 (S12: tap operation & S20: registration icon), the terminal program 65 performs the WF registering processing illustrated in FIG. 6 (S23). Then, in response to the end of the WF registering processing (S23), the terminal program 65 performs the processing of S11 and subsequent steps.

[Effects of this Embodiment]

According to the embodiment described above, by registering WF records in the WF list in advance, the multi-function peripheral 10 can be caused to perform various workflows only by holding the mobile terminal 50 over the multi-function peripheral 10. In other words, in a case where the multi-function peripheral 10 is caused to repeatedly perform a same workflow or the like, an especially advantageous effect can be expected. In addition, according to the embodiment described above, in a case where a plurality of WF records including a same device ID are registered, an appropriate WF record is selected in response to the designation of one of the designated data and the designated output destination.

Furthermore, according to the embodiment described above, in a case where any WF record coinciding with the first condition is not present, WF records coinciding with the second condition are extracted. Accordingly, even in a case where a WF record is not registered for each multi-function peripheral 10, the multi-function peripheral 10, over which the mobile terminal 50 is held, can be caused to perform a workflow defined in a WF record not including any device ID. In this way, a user operation for causing a designated device to perform a workflow can be further simplified.

In addition, according to the embodiment described above, in a case where any WF record coinciding with the second condition is not present, WF records coinciding with the third condition are extracted. Accordingly, a workflow defined in a WF record associated with the other multi-function peripheral 10 can be temporarily performed by the designated device. In addition, the terminal program 65 may allow the user to select one of the execution instruction processing and the WF registering processing through the input I/F 54 in response to the extraction of WF records coinciding with the third condition.

According to such procedure, it is possible to allow the user to select whether the designated device is caused to perform a workflow in response to a WF record associated with the other multi-function peripheral 10 or a WF record associated with the designated device is newly registered. In addition, in response to not only the designation of the [REGISTRATION] icon 113 but also the holding of the mobile terminal 50 over the multi-function peripheral 10 in which any executable WF record is not present, a WF record associated with the multi-function peripheral 10 can be registered. Therefore, a user operation required for the WF registering processing can be simplified.

In more detail, the terminal program 65 may be configured to display a first icon corresponding to an execution instruction for the execution instruction processing and a second icon corresponding to an execution instruction for the WF registering processing on the display 53. Then, in response to the receiving of designation of the first icon through the input I/F 54, the terminal program 65 may cause a designated device to perform a workflow defined in an extracted WF record coinciding with the third condition. On the other hand, in response to the receiving of designation of the second icon through the input I/F 54, the terminal program 65 may register a WF record having the designated device ID specified in S12 and the action ID and the condition information included in the WF record coinciding with the third condition in the WF list.

The workflow according to the embodiment described above is defined by the action ID that is one example of the action identification information and the condition information associated with the action ID. However, a specific example of the action identification information is not limited to the example described above, and action unit identification information to identify an action unit performing the workflow and the condition information described above may be included. In other words, the workflow may be defined only based on the action identification information.

In the multi-function peripheral 10 and the mobile terminal 50 according to the embodiment described above, an example has been described in which each processing performed by the controller according to this disclosure is realized by the CPUs 31 and 61 performing various programs stored in the memories 32 and 62. However, the configuration of the controller is not limited thereto, but a part or the whole thereof may be realized by hardware such as an integrated circuit.

In addition, this disclosure may be realized not only as the multi-function peripheral 10 and the mobile terminal 50 but as a program causing the multi-function peripheral 10 and the mobile terminal 50 to perform the processing. The program may be provided with being recorded on a non-transitory recording medium. The non-transitory recording medium may include a storage unit mounted in a server that can be connected to the multi-function peripheral 10 and the mobile terminal 50 through a communication network in addition to a CD-ROM, a DVD-ROM, and the like. Then, the program stored in the storage unit of the server may be transmitted through a communication network such as the Internet 101 as information or a signal representing the program.

According to this disclosure, by registering workflow information in advance, an image processing apparatus can be caused to perform various actions by only holding a mobile terminal over the image processing apparatus. Further, a particularly advantageous effect can be expected in a case where the image processing apparatus is caused to repeatedly perform a same operation or the like.

What is claimed is:

1. A non-transitory computer-readable medium storing instructions readable by a mobile terminal including a memory, an input interface, a first communication interface that performs proximity wireless communication with an external device, and a second communication interface that performs wireless communication, of which a communication distance is longer than the proximity wireless communication, with an external device, the instructions causing the mobile terminal to perform processes comprising:

a storage processing of storing workflow information including device identification information and action identification information in the memory, wherein the device identification information is information to identify an image processing apparatus designated by a user, and the action identification information is information to identify an action designated by the user among a plurality of actions for image data;

a specifying processing of specifying the image processing apparatus that is being in proximity wireless connection with the first communication interface, as a designated device;

an information reception processing of receiving connection information from the designated device through the first communication interface, wherein the connection information is information required to communicate with the designated device through the second communication interface;

an extraction processing of extracting the workflow information coinciding with a first condition, among the workflow information stored in the memory, wherein the first condition is a condition where the workflow information includes designated device identification information that is the device identification information of the designated device; and an execution instruction processing of transmitting execution instruction information to the designated device through the second communication interface by using the connection information received in the information reception processing, wherein the execution instruction information is information used to instruct execution of the action identified by the action identification information included in the workflow information extracted by the extraction processing.

2. The non-transitory computer-readable medium storing instructions according to claim 1,
wherein the instructions causes the mobile terminal to further perform one of:
a first operation reception processing of receiving a user operation designating designated data, which is a target of an output action, through the input interface; and
a second operation reception processing of receiving a user operation designating a designated output destination, which is an output destination of generated data generated by an input action, through the input interface,
wherein in response to extraction of both first workflow information and second workflow information in the extraction processing, the instructions causes the mobile terminal to further perform:
a determination processing of determining whether the first operation reception processing or the second operation reception processing is performed wherein the first workflow information is the workflow information including the action identification information of the output action, and the second workflow information is the workflow information including the action identification information of the input action, and
wherein in response to a determination that the first operation reception processing is performed in the determination processing, in the execution instruction processing, the mobile terminal performs a first execution instruction processing of transmitting the execution instruction information, which is used to instruct execution of the output action for the designated data, to the designated device through the second communication interface; and
wherein, in response to a determination that the second operation reception processing is performed in the determination processing, in the execution instruction processing, the mobile terminal performs:
a second execution instruction processing of transmitting the execution instruction information, which is used to instruct to output the generated data generated by the input action to the designated output destination, to the designated device through the second communication interface.

3. The non-transitory computer-readable medium storing instructions according to claim 2,
wherein in response to a determination that none of the first operation reception processing and the second operation reception processing is performed in the determination processing, the instructions causes the mobile terminal to perform:
a third operation reception processing of receiving a user operation designating one of the first workflow information and the second workflow information that are extracted through the input interface,
wherein in response to designation of the first workflow information in the third operation reception processing, the mobile terminal performs the first operation reception processing and the first execution instruction processing, and
wherein in response to designation of the second workflow information in the third operation reception processing, the mobile terminal performs the second operation reception processing and the second execution instruction processing.

4. The non-transitory computer-readable medium storing instructions according to claim 1
wherein, in the storage processing, the mobile terminal is capable of storing the workflow information not including the device identification information is capable, in the memory,
wherein, in the information reception processing, the mobile terminal further receives the action identification information of the actions, which are capable of being performed by the designated device, from the designated device, and
wherein, in the extraction processing in a case where the workflow information coinciding with the first condition is not stored in the memory, the mobile terminal extracts the workflow information coinciding with a second condition, wherein the second condition is a condition where the workflow information does not include the device identification information but include the action identification information received in the information reception processing.

5. The non-transitory computer-readable medium storing instructions according to claim 4,
wherein in the extraction processing in a case where the workflow information coinciding with the second condition is not stored in the memory, the mobile terminal extracts the workflow information coinciding with a third condition, wherein the third condition is a condition where the workflow information includes the device identification information different from the designated device identification information and includes the action identification information received in the information reception processing.

6. The non-transitory computer-readable medium storing instructions according to claim 5,
wherein, in response to extraction of the workflow information coinciding with the third condition in the extraction processing, the instructions causes the mobile terminal to perform:
a fourth operation reception processing of receiving one of a first operation of instructing execution of the execution instruction processing and a second operation instructing execution of the storage processing through the input interface,
wherein in response to receiving of the first operation in the fourth operation reception processing, the mobile terminal performs the execution instruction information, and
wherein in response to receiving of the second operation in the fourth operation reception processing, the mobile terminal performs the storage processing storing the workflow information including the action identification information and the designated device identification information included in the workflow information extracted in the extraction processing, in the memory.

7. The non-transitory computer-readable medium storing instructions according to claim 1,
wherein in response to that the workflow information is not extracted in the extraction processing, the instructions causes the mobile terminal to perform:
a decision processing of deciding the action identification information included in the workflow information; and
the storage processing of storing the workflow information including the action identification information decided in the decision processing and the designated device identification information in the memory.

8. The non-transitory computer-readable medium storing instructions according to claim 1,
wherein the workflow information includes a condition information representing an execution condition of the action identified by the action identification information, and
wherein in the execution instruction processing, the mobile terminal transmits the execution instruction information, which is used to instruct execution of the action according to the execution condition identified by the condition information, to the designated device through the second communication interface.

9. The non-transitory computer-readable medium storing instructions according to claim 1,
wherein the second communication interface is capable of performing indirect wireless communication, by which the mobile terminal wirelessly communicates with an external device through a relay device, and direct wireless communication, by which the mobile terminal wirelessly communicates with an external device not through the relay device, and
wherein in the execution instruction processing, the mobile terminal transmits the execution instruction information to the designated device through the direct wireless communication using the connection information.

10. A non-transitory computer-readable medium storing instructions readable by a mobile terminal including a memory, an input interface, a first communication interface that performs proximity wireless communication with an external device, and a second communication interface that performs wireless communication, of which a communication distance is longer than the proximity wireless communication, with an external device, the instructions causing the mobile terminal to perform processes comprising:
a storage processing of storing workflow information including action identification information in the memory, wherein the action identification information is information to identify an action designated by the user among a plurality of actions for image data;
a specifying processing of specifying the image processing apparatus that is being in proximity wireless connection with the first communication interface, as a designated device;
an information reception processing of receiving device information from the designated device, wherein the device information includes: connection information required to communicate with the designated device through the second communication interface; and the action identification information of the action that is capable of being performed by the designated device;
an extraction processing of extracting the workflow information including the action identification information received in the information reception processing, among the workflow information stored in the memory; and
an execution instruction processing of transmitting execution instruction information to the designated device through the second communication interface by using the connection information received in the reception processing, wherein the execution instruction information is information used to instruct execution of the action identified by the action identification information included in the workflow information extracted by the extraction processing.

11. A non-transitory computer-readable medium storing instructions readable by a mobile terminal including a memory, an input interface, a first communication interface that performs proximity wireless communication with an external device, and a second communication interface that performs wireless communication, of which a communication distance is longer than the proximity wireless communication, with an external device, the instructions causing the mobile terminal to perform processes comprising:
a first decision processing of deciding a designated device as an input device or an output device, wherein the designated device is a device designated through the input interface, among a plurality of external devices that are communicable through the second communication interface;
a second decision processing of deciding a connection device as the input device or the output device, wherein the connection device is a device being in proximity wireless connection with the first communication interface among the plurality of external devices that are communicable through the second communication interface;
a registration processing of storing linkage action information including input device information and output device information in the memory, wherein the input information is information to identify the input device decided in the first decision processing or the second decision processing, and the output device information is information to identify the output device decided in the first decision processing or the second decision processing,
a first operation reception processing of receiving a designation operation designating one of the linkage action information stored in the memory through the input interface;
an input instruction processing of transmitting input instruction information to the input device identified by the input device information included in the designated linkage action information through the second communication interface, wherein the input instruction information is information to execute an input action, wherein the input action is an action in which the input device inputs target data to the input device, and wherein the target data is data to be transmitted from the input device to the mobile terminal;
a data reception processing of receiving the target data from the input device through the second communication interface, as a response to the input instruction information; and
an output instruction processing of transmitting output instruction information to the output device through the second communication interface, wherein the output device is a device identified by the output device information included in the designated linkage action information, wherein the output instruction information is information to execute an output action, and wherein the output action is an action in which the output device outputs the target data received in the data reception processing.

12. A non-transitory computer-readable medium storing instructions readable by a mobile terminal including a memory, an input interface, a first communication interface that performs proximity wireless communication with an external device, and a second communication interface that performs wireless communication, of which a communication distance is longer than the proximity wireless communication, with an external device, the instructions causing the mobile terminal to perform processes comprising:
 a first operation reception processing of receiving a designation operation designating one of linkage action information stored in the memory through the input interface, wherein the linkage action information includes at least one of input device information to identify an input device and output device information to identify an output device;
 an instruction reception processing of receiving an execution instruction of a linkage action according to the designated linkage action information in response to receiving of the designation operation in the first operation reception process through at least one of the input interface and the first communication interface;
 a decision processing of deciding, in response to receiving of the execution instruction through the first communication interface in the instruction reception processing, a connection device as the input device or the output device, wherein the connection device is one of the plurality of external devices communicable through the second communication interface and is being in proximity wireless connection with the first communication interface, and wherein the execution instruction through the first communication interface is a instruction which is obtained by connecting to the connection device with the first communication interface by proximity wireless communication;
 an input instruction processing of transmitting input instruction information to one of the input device identified by the input device information included in the designated linkage action information and the input device decided in the first decision processing through the second communication interface, wherein the input instruction information is information to execute an input action, wherein the input action is an action in which the input device inputs target data to the input device, and wherein the target data is data to be transmitted from the input device to the mobile terminal to the input device;
 a data reception processing of receiving the target data from the input device through the second communication interface, as a response to the input instruction information; and
 an output instruction processing of transmitting output instruction information to the output device through the second communication interface, wherein the output device is identified by the output device information included in the designated linkage action information or the output device determined in the first determination processing, wherein the output instruction information is information to execute an output action, and wherein the output action is an action in which the output device outputs the target data received in the data reception processing.

13. A non-transitory computer-readable medium storing instructions readable by a mobile terminal including a memory, an input interface, a first communication interface that performs proximity wireless communication with an external device, and a second communication interface that performs wireless communication, of which a communication distance is longer than the proximity wireless communication, with an external device, the instructions causing the mobile terminal to perform processes comprising:
 a registration processing of storing linkage action information including input device information and output device information in the memory, wherein the input device information is information to identify the input device designated by a user, and wherein the output device information is information to identify the output device designated by the user;
 a first acquiring processing of acquiring a designated device information to identify the designated device that is an image processing device in response to that the first communication interface is being in proximity wireless connection with the image processing device;
 an extraction processing of extracting the linkage action information including at least one of the input device information as the same as the designated device information and the output device information as the same as the designated device information, among the linkage action information stored in the memory;
 an input instruction processing of transmitting input instruction information to the input device identified by the input device information included in the extracted linkage action information through the second communication interface, wherein the input instruction information is information to execute an input action, wherein the input action is an action in which the input device inputs target data to the input device, and wherein the target data is data to be transmitted from the input device to the mobile terminal;
 a first data reception processing of receiving the target data from the input device through the second communication interface as a response to the input instruction information; and
 an output instruction processing of transmitting output instruction information to the output device through the second communication interface, wherein the output device is identified by the output device information included in the extracted linkage action information, wherein the output instruction information is information to execute an output action, and wherein the output action is an action in which the output device outputs the target data received in the first data reception processing.

* * * * *